US012403693B2

(12) United States Patent
Han et al.

(10) Patent No.: US 12,403,693 B2
(45) Date of Patent: Sep. 2, 2025

(54) INKJET PRINTING DEVICE AND METHOD OF MANUFACTURING DISPLAY DEVICE USING THE SAME

(71) Applicant: Samsung Display Co., Ltd., Yongin-Si (KR)

(72) Inventors: Jeongwon Han, Seongnam-si (KR); Jongho Park, Hwaseong-si (KR); Taeho Yang, Suwon-si (KR); Myungsoo Huh, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 17/963,810

(22) Filed: Oct. 11, 2022

(65) Prior Publication Data

US 2023/0219343 A1 Jul. 13, 2023

(30) Foreign Application Priority Data

Jan. 11, 2022 (KR) ........................ 10-2022-0003806

(51) Int. Cl.
*B41J 2/145* (2006.01)
*B41J 2/165* (2006.01)
*B41M 3/00* (2006.01)

(52) U.S. Cl.
CPC ........... *B41J 2/145* (2013.01); *B41J 2/16505* (2013.01); *B41M 3/003* (2013.01)

(58) Field of Classification Search
CPC ... B41J 2/1433; B41J 2/145; B41J 2/14; B41J 2002/14411; B41J 2002/14419; B41J 2/11; B41J 3/543; B41J 2/162; B41J 2002/14459; B41J 2/16505; B41J 3/4073; B41J 2/2139; B41J 2/17513; B41M 3/003; B41M 5/0047
See application file for complete search history.

(56) References Cited

U.S. PATENT DOCUMENTS

| | | | | |
|---|---|---|---|---|
| 9,216,576 B2 | 12/2015 | Kobayashi et al. | | |
| 10,786,998 B2 | 9/2020 | Tokimatsu et al. | | |
| 2009/0009565 A1* | 1/2009 | Oh | ....................... | B41J 2/14233 347/94 |
| 2009/0073241 A1* | 3/2009 | Sim | ...................... | B41J 2/14233 347/68 |

(Continued)

FOREIGN PATENT DOCUMENTS

| | | | |
|---|---|---|---|
| JP | 6325145 | B1 | 5/2018 |
| JP | 6769043 | B2 | 10/2020 |
| JP | 2012254531 | A | 12/2021 |

*Primary Examiner* — Jannelle M Lebron
(74) *Attorney, Agent, or Firm* — Innovation Counsel LLP

(57) ABSTRACT

An inkjet printing device includes a chamber having an imaginary centerline that divides a length of the chamber in the first direction into two halves, and a plurality of inkjet nozzles coupled to the chamber and receiving ink from the chamber, the inkjet nozzles being arranged in a plurality of columns along a first direction. The inkjet nozzles include a center column nozzle disposed adjacent to the centerline of the chamber and an outer column nozzle disposed farther from the centerline than the center column nozzle. The chamber includes a bump portion disposed farther from the centerline than the outer column nozzle, the bump portion including a bump on an inner surface of the chamber.

15 Claims, 15 Drawing Sheets

(56) References Cited

U.S. PATENT DOCUMENTS

| | | | | |
|---|---|---|---|---|
| 2015/0138282 | A1* | 5/2015 | Kobayashi | B41J 2/055 347/70 |
| 2021/0026193 | A1* | 1/2021 | Yu | G02F 1/133516 |
| 2021/0121909 | A1 | 4/2021 | Masunari et al. | |
| 2021/0245505 | A1* | 8/2021 | Marubayashi | B41J 2/1629 |

* cited by examiner

INKJET PRINTING DEVICE AND METHOD OF MANUFACTURING DISPLAY DEVICE USING THE SAME

This U.S. non-provisional patent application claims priority, under 35 U.S.C. § 119, from Korean Patent Application No. 10-2022-0003806 filed on Jan. 11, 2022, the content of which is hereby incorporated by reference in its entirety.

BACKGROUND

1. Field of Disclosure

The present disclosure relates to an inkjet printing device and a method of manufacturing a display device using the same. More particularly, the present disclosure relates to an inkjet printing device capable of reducing defects and a method of manufacturing a display device using the inkjet printing device.

2. Description of the Related Art

As a display panel, a transmissive type display panel that selectively transmits a source light generated by a light source and a reflective type display panel that generates a source light by itself are widely used. The display panel includes different types of light control patterns depending on pixels to display color images. The light control patterns transmit the source light having a specific wavelength range or convert a color of the source light. Some light control patterns change properties of the light without changing the color of the source light.

An inkjet printing process, which is one of the processes to form the light control patterns, is a printing method that sprays a liquid ink accommodated in an inkjet head onto a substrate through an inkjet nozzle of the inkjet head to form a desired pattern.

In the process of spraying the liquid ink through the inkjet nozzle, when nano-scale particles contained in the liquid ink are non-uniformly sprayed for each nozzle, stains caused by concentration differences are visible from the outside.

SUMMARY

The present disclosure provides an inkjet printing device capable of discharging ink to a plurality of nozzles at uniform concentration to prevent or reduce defects.

The present disclosure provides a method of manufacturing a display device using the inkjet printing device.

In one aspect, the inventive concept provides an inkjet printing device including a chamber having an imaginary centerline that divides a length of the chamber in the first direction into two halves, and a plurality of inkjet nozzles coupled to the chamber and receiving ink from the chamber, the inkjet nozzles being arranged in a plurality of columns along a first direction. The inkjet nozzles include a center column nozzle disposed adjacent to the centerline of the chamber, and an outer column nozzle disposed farther from the centerline than the center column nozzle. The chamber includes a bump portion disposed farther from the centerline than the outer column nozzle, the bump portion including a bump on an inner surface of the chamber.

The bump portion may include a recessed portion on an outer surface of the chamber.

The bump portion may have a circular arc shape with a predetermined curvature in the cross-section.

The center column nozzle may include a first center column nozzle and a second center column nozzle disposed adjacent to the centerline from each other and spaced apart from each other in the first direction, the outer column nozzle includes a first outer column nozzle disposed adjacent to the first center column nozzle and a second outer column nozzle disposed adjacent to the second center column nozzle, and the bump portion includes a first bump portion disposed adjacent to the first outer column nozzle and a second bump portion disposed adjacent to the second outer column nozzle.

Each of the center column nozzle and the outer column nozzle may include a plurality of unit nozzles arranged in a second direction crossing the first direction.

The bump portion may extend in the second direction.

The plurality of unit nozzles may include an outer row unit nozzle disposed at an outermost position in the second direction, and the chamber further includes an additional bump portion disposed adjacent to the outer row unit nozzle.

There may be a damper member inside the chamber, wherein the damper member is disposed to overlap each of the inkjet nozzles when viewed in a plane.

The inkjet nozzles may discharge ink that includes nanoparticles.

The nanoparticles may include a quantum dot that converts a wavelength of an incident light to a light having a wavelength different from the wavelength of the incident light.

The nanoparticles may include a scatterer that scatters the incident light.

The ink includes a first ink supplied to the center column nozzle and a second ink supplied to the outer column nozzle, and a volume number density of the nanoparticles of the first ink is substantially equal to a volume number density of the nanoparticles of the second ink.

The ink is discharged to the inkjet nozzles by a pressure formed in the chamber.

In another aspect, the inventive concept provides an inkjet printing device including a chamber having an imaginary centerline that divides a length of the chamber in the first direction into two halves, and a plurality of inkjet nozzles coupled to the chamber and receiving ink from the chamber, the inkjet nozzles being arranged in a plurality of columns along a first direction. The inkjet nozzles include a center column nozzle disposed adjacent to the centerline of the chamber and an outer column nozzle disposed farther from the centerline than the center column nozzle, wherein the chamber includes a bump on an inner surface of the chamber, the bump having a circular arc shape in a cross-section.

In yet another aspect, the inventive concept provides a method of manufacturing a display device. The method includes preparing a display panel, and forming a light control layer on the display panel. The forming of the light control layer includes supplying ink including a plurality of nanoparticles to between a plurality of barrier walls using an inkjet printing device to form a light control pattern. The inkjet printing device includes a chamber having an imaginary centerline that divides a length of the chamber in the first direction into two halves, and a plurality of inkjet nozzles coupled to the chamber and receiving ink from the chamber, the inkjet nozzles being arranged in a plurality of columns along a first direction. The inkjet nozzles include a center column nozzle disposed adjacent to the centerline of the chamber and an outer column nozzle disposed farther from the centerline than the center column nozzle. The chamber includes a bump portion that is farther rom the centerline than the outer column nozzle, the bump portion comprising a bump on an inner surface of the chamber.

The incident light may be light having a first wavelength, and the light control pattern includes a first light control pattern converting the light having the first wavelength to a light having a second wavelength and a second light control pattern converting the light having the first wavelength to a light having a third wavelength.

According to the above, the number of the nanoparticles and the concentration of the nanoparticles in the ink entering the nozzles may be controlled to be uniform at each of the nozzles in the inkjet printing device, and thus, the inks ejected through the nozzles have uniform concentration. Accordingly, the inkjet printing device prevents defects, such as stains, from occurring in the light control pattern due to a non-uniform concentration when manufacturing the light control pattern.

BRIEF DESCRIPTION OF THE DRAWINGS

The above and other advantages of the present disclosure will become readily apparent by reference to the following detailed description when considered in conjunction with the accompanying drawings, wherein.

DETAILED DESCRIPTION

Figure 1A:
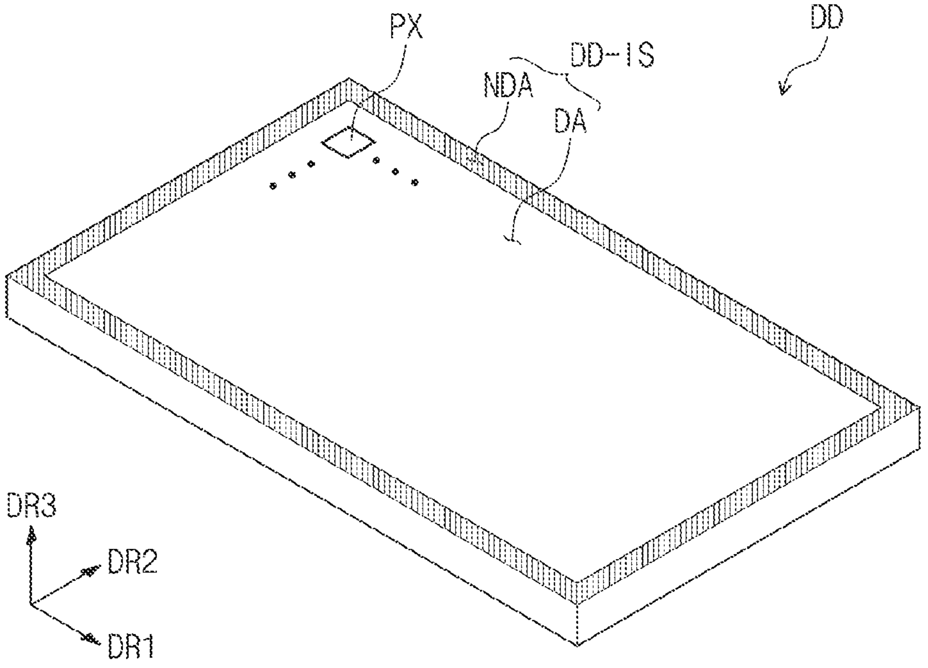
FIG. 1A is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a display device, a method of manufacturing the display device, and an inkjet printing device used in the manufacturing method of the display device according to embodiments of the present disclosure will be described with reference to accompanying drawings.

Figure 1B:
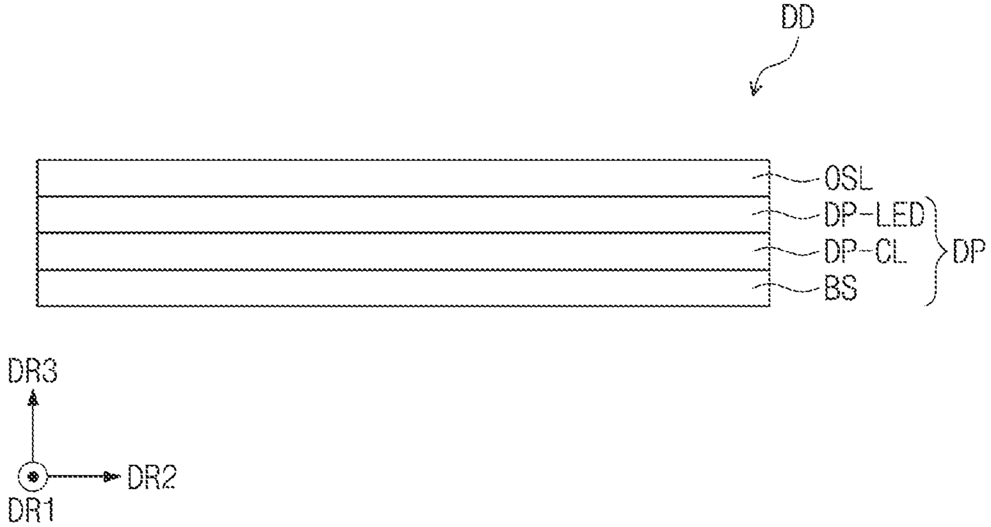
FIG. 1B is a cross-sectional view of a display device according to an embodiment of the present disclosure.
Figure 1C:
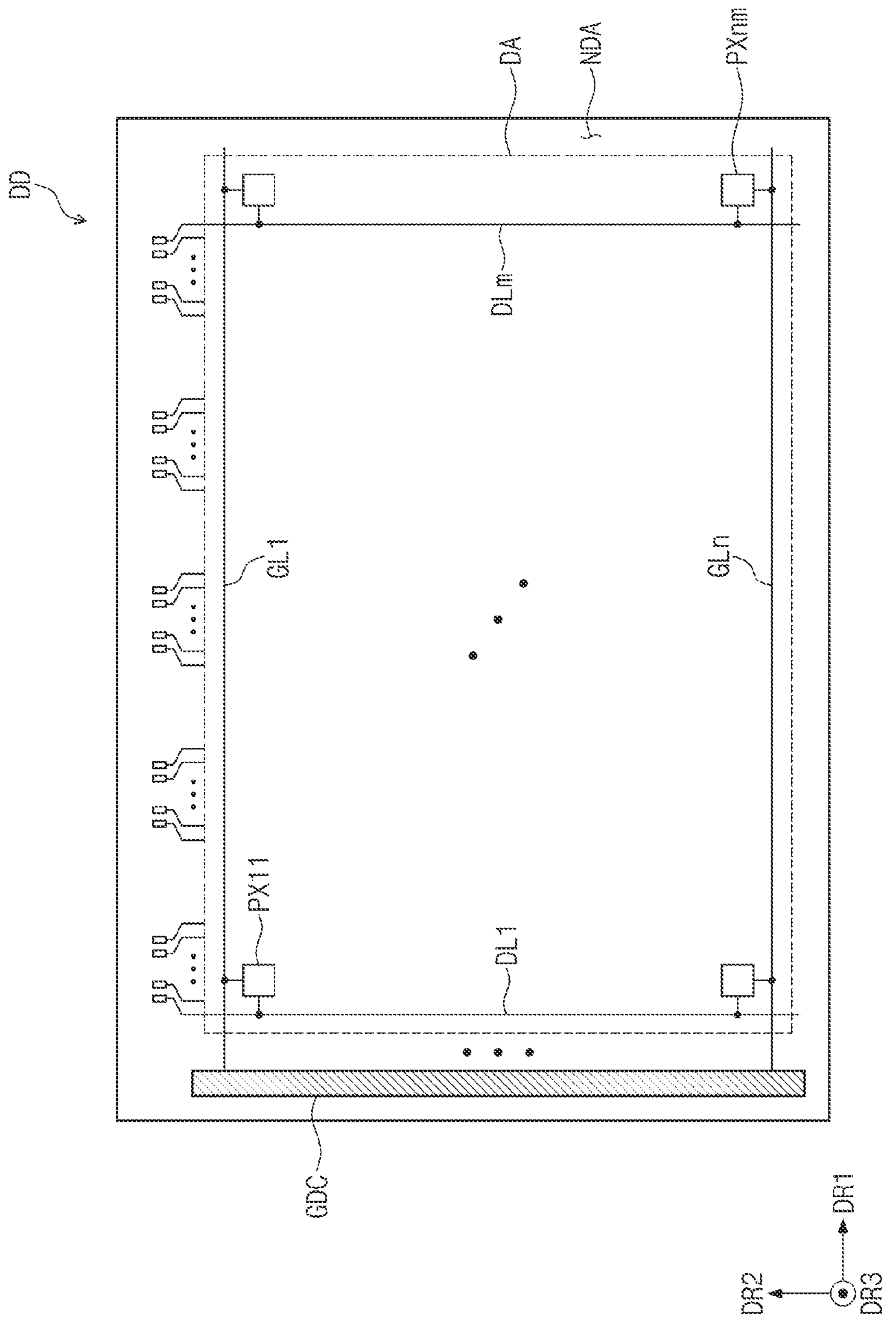
FIG. 1C is a plan view of a display device according to an embodiment of the present disclosure.

FIG. 1A is a perspective view of a display device DD according to an embodiment of the present disclosure. FIG. 1B is a cross-sectional view of the display device DD according to an embodiment of the present disclosure. FIG. 1C is a plan view of the display device DD according to an embodiment of the present disclosure.

Referring to FIG. 1A, the display device DD may display an image through a display surface DD-IS. The display surface DD-IS may be substantially parallel to a plane defined by a first direction DR1 and a second direction DR2. The display surface DD-IS may include a display area DA and a non-display area NDA. A pixel PX may be disposed in the display area DA and may not be disposed in the non-display area NDA. The non-display area NDA may be defined along an edge of the display surface DD-IS. The non-display area NDA may surround the display area DA; however, this is not a limitation of the inventive concept. For example, in some embodiments, the non-display area NDA may be omitted or may be disposed at only one side of the display area DA.

A third direction DR3 may indicate a direction that is normal to the display surface DD-IS, i.e., a thickness direction of the display device DD. Front (or upper) and rear (or lower) surfaces of each layer or each unit described hereinafter may be distinguished from each other by the third direction DR3. However, the first, second, and third directions DR1, DR2, and DR3 described in the present embodiment are merely examples.

According to an embodiment, the display device DD may include the display surface DD-IS that is a flat type, however, the display surface DD-IS should not be limited to the flat type. The display device DD may include a curved display surface or a three-dimensional display surface. The three-dimensional display surface may include plural display areas that face different directions from each other.

Referring to FIG. 1B, the display device DD may include a base substrate BS, a circuit element layer DP-CL, a display element layer DP-LED, and an optical structure layer OSL. Meanwhile, in the following descriptions, the base substrate BS, the circuit element layer DP-CL, and the display element layer DP-LED may be collectively referred to as a display panel DP.

The base substrate BS may include a synthetic resin substrate or a glass substrate. The circuit element layer DP-CL may include at least one insulating layer and a circuit element. The circuit element may include a signal line and a pixel driving circuit. The circuit element layer DP-CL may be formed by a process of forming an insulating layer, a semiconductor layer, and a conductive layer, such as coating and depositing processes, and a process of patterning the insulating layer, the semiconductor layer, and the conductive layer, such as a photolithography process. The display element layer DP-LED may include at least a display element.

The optical structure layer OSL may convert a color of the light provided from the display element. The optical structure layer OSL may include a light control pattern and a structure to improve a light conversion efficiency. Meanwhile, the optical structure layer OSL may be referred to as an optical substrate or an upper panel.

FIG. 1C shows an arrangement relationship between signal lines GL1 to GLn and DL1 to DLm and pixels PX11 to PXnm, which are included in the display device DD, on a plane. The signal lines GL1 to GLn and DL1 to DLm may include a plurality of gate lines GL1 to GLn and a plurality of data lines DL1 to DLm.

Each of the pixels PX11 to PXnm may be connected to a corresponding gate line among the gate lines GL1 to GLn and a corresponding data line among the data lines DL1 to DLm. Each of the pixels PX11 to PXnm may include the pixel driving circuit and the display element. More types of signal lines may be provided in the display panel DP according to a configuration of the pixel driving circuit.

The pixels PX11 to PXnm may be arranged in a matrix configuration; however, the arrangement of the pixels PX11 to PXnm should not be limited to the matrix configuration. According to an embodiment, the pixels PX11 to PXnm may be arranged in a pentile configuration. For instance, positions at which the pixels PX11 to PXnm are disposed may correspond to vertices of a diamond shape. A gate driving circuit GDC may be integrated in the display panel DP through an oxide silicon gate driver circuit (OSG) process or an amorphous silicon gate driver circuit (ASG) process.

Figure 2A:
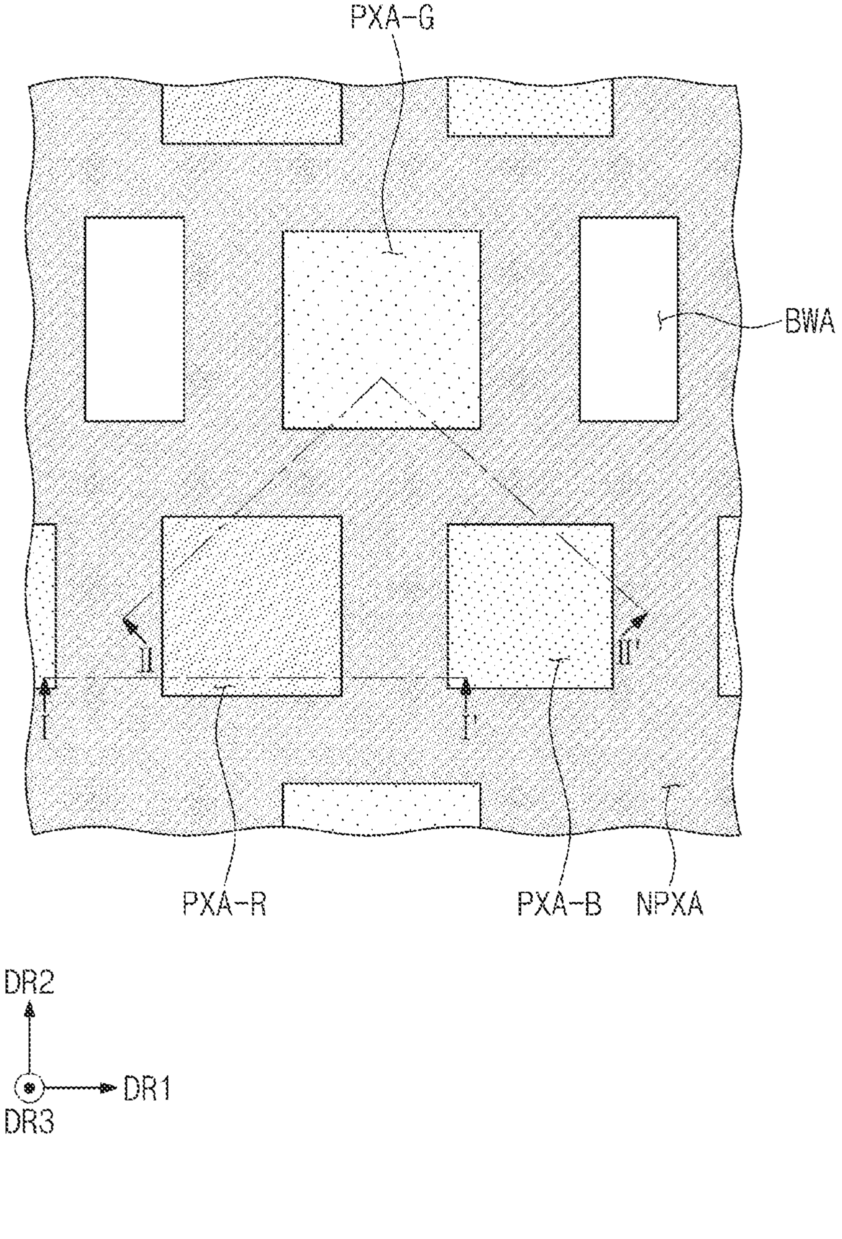
FIG. 2A is an enlarged plan view of a portion of a display device according to an embodiment of the present disclosure.

FIG. 2A is an enlarged plan view of a portion of the display device according to an embodiment of the present disclosure. FIG. 2A is a plan view showing three pixel areas PXA-R, PXA-G, and PXA-B and a bank well area BWA adjacent to the three pixel areas PXA-R, PXA-G, and PXA-B of the display device DD (refer to FIG. 1A) as a representative example. According to an embodiment, the three pixel areas PXA-R, PXA-G, and PXA-B shown in FIG. 2A may be repeatedly arranged in the whole area of the display area DA (refer to FIG. 1A).

A peripheral area NPXA may be defined around first, second, and third pixel areas PXA-R, PXA-G, and PXA-B. The peripheral area NPXA may define a boundary of the first, second, and third pixel areas PXA-R, PXA-G, and PXA-B. The peripheral area NPXA may surround the first, second, and third pixel areas PXA-R, PXA-G, and PXA-B. A structure, e.g., a pixel definition layer PDL (refer to FIG. 2B) or a bank BMP (refer to FIG. 2B), to prevent a mixture of colors between the first, second, and third pixel areas PXA-R, PXA-G, and PXA-B may be disposed in the peripheral area NPXA.

FIG. 2A shows the first, second, and third pixel areas PXA-R, PXA-G, and PXA-B that have the same shape as each other but different sizes from each other when viewed in a plane; however, this is not a limitation of the inventive concept. Among the first, second, and third pixel areas PXA-R, PXA-G, and PXA-B, at least two pixel areas may have the same size as each other. The size of each of the first, second, and third pixel areas PXA-R, PXA-G, and PXA-B may be determined according to the color of light emitted therefrom. Among primary colors, a pixel area emitting a red light may have the largest size, and a pixel area emitting a blue light may have the smallest size.

In FIG. 2A, when viewed in a plane, the first, second, and third pixel areas PXA-R, PXA-G, and PXA-B may have a rectangular shape; however, this is not a limitation of the inventive concept. When viewed in the plane, the first, second, and third pixel areas PXA-R, PXA-G, and PXA-B may have other polygonal shapes, such as a rhombus shape, a pentagonal shape, etc. According to an embodiment, the first, second, and third pixel areas PXA-R, PXA-G, and PXA-B may have a substantially rectangular shape with a rounded corner when viewed in the plane.

FIG. 2A shows a structure in which the second pixel area PXA-G is arranged in a first row and the first pixel area PXA-R and the third pixel area PXA-B are arranged in a second row; however, this is a representative example and not a limitation of the present disclosure. According to an embodiment, the arrangement of the first, second, and third pixel areas PXA-R, PXA-G, and PXA-B may be changed in various ways. For example, the first, second, and third pixel areas PXA-R, PXA-G, and PXA-B may be arranged in the same row.

One of the first, second, and third pixel areas PXA-R, PXA-G, and PXA-B may provide a third light corresponding to a source light, another of the first, second, and third pixel areas PXA-R, PXA-G, and PXA-B may provide a first light different from the third light, and the other of the first, second, and third pixel areas PXA-R, PXA-G, and PXA-B may provide a second light different from the first light and the third light. In the present embodiment, the third pixel area PXA-B may provide the third light corresponding to the source light. In the present embodiment, the first pixel area PXA-R may provide a red light, the second pixel area PXA-G may provide a green light, and the third pixel area PXA-B may provide a blue light.

The display area DA (refer to FIG. 1A) may include the bank well area BWA defined therein. The bank well area BWA may be an area where a bank well is formed to prevent defects caused by mis-ejection in a process of patterning a plurality of light control patterns CCP-R, CCP-G, and CCP-B (refer to FIG. 2C) included in the light control layer CCL (refer to FIG. 2C). That is, the bank well area BWA may be an area defined by removing a portion of the bank BMP (refer to FIG. 2C).

FIG. 2A shows two rectangular bank well areas BWA defined adjacent to the second pixel area PXA-G; it should be understood that this is a representative example, and the shape and arrangement of the bank well area BWA should not be limited to what is depicted.

Figure 2B:
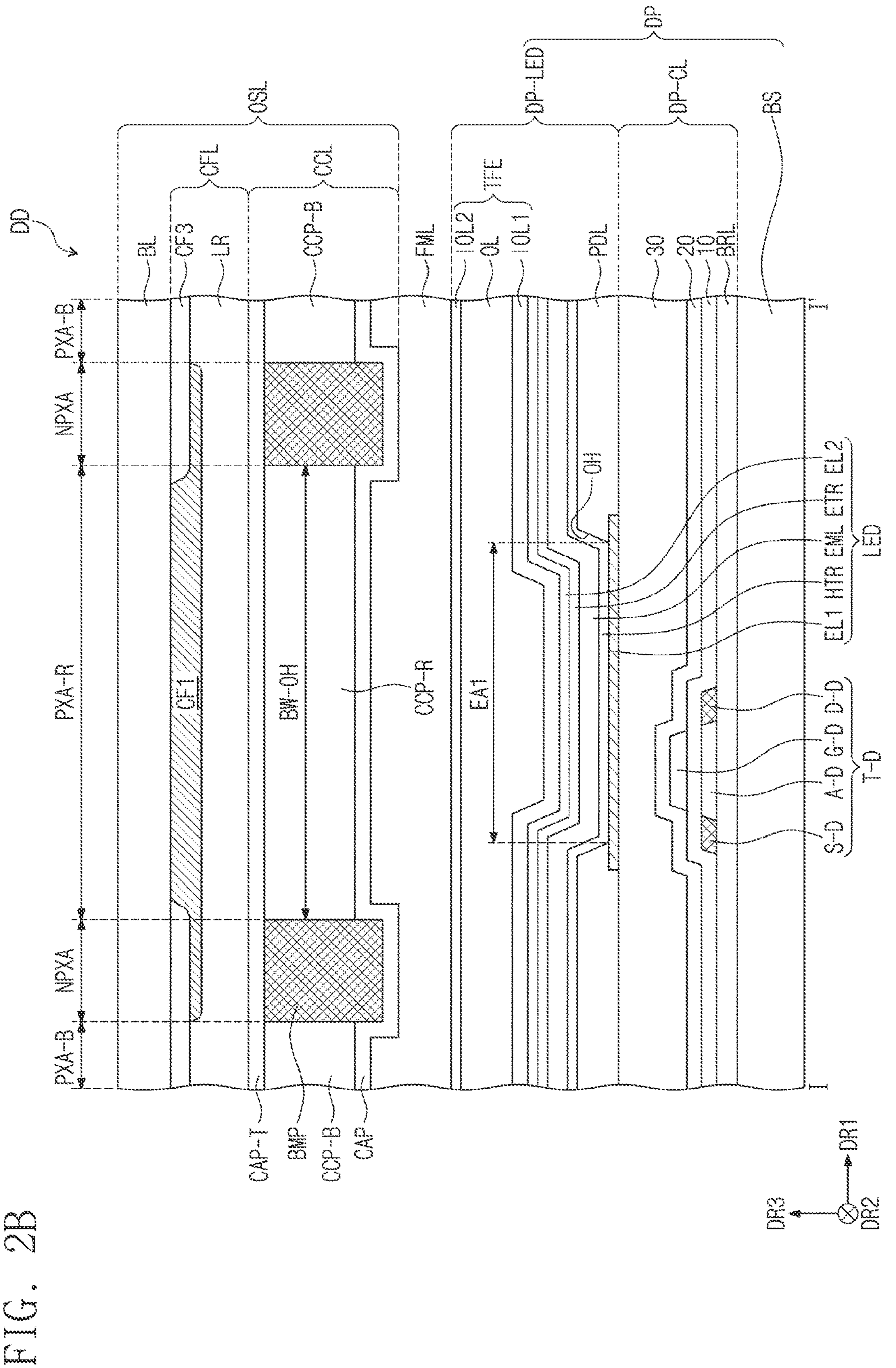
FIG. 2B is a cross-sectional view of a display panel according to an embodiment of the present disclosure.
Figure 2C:
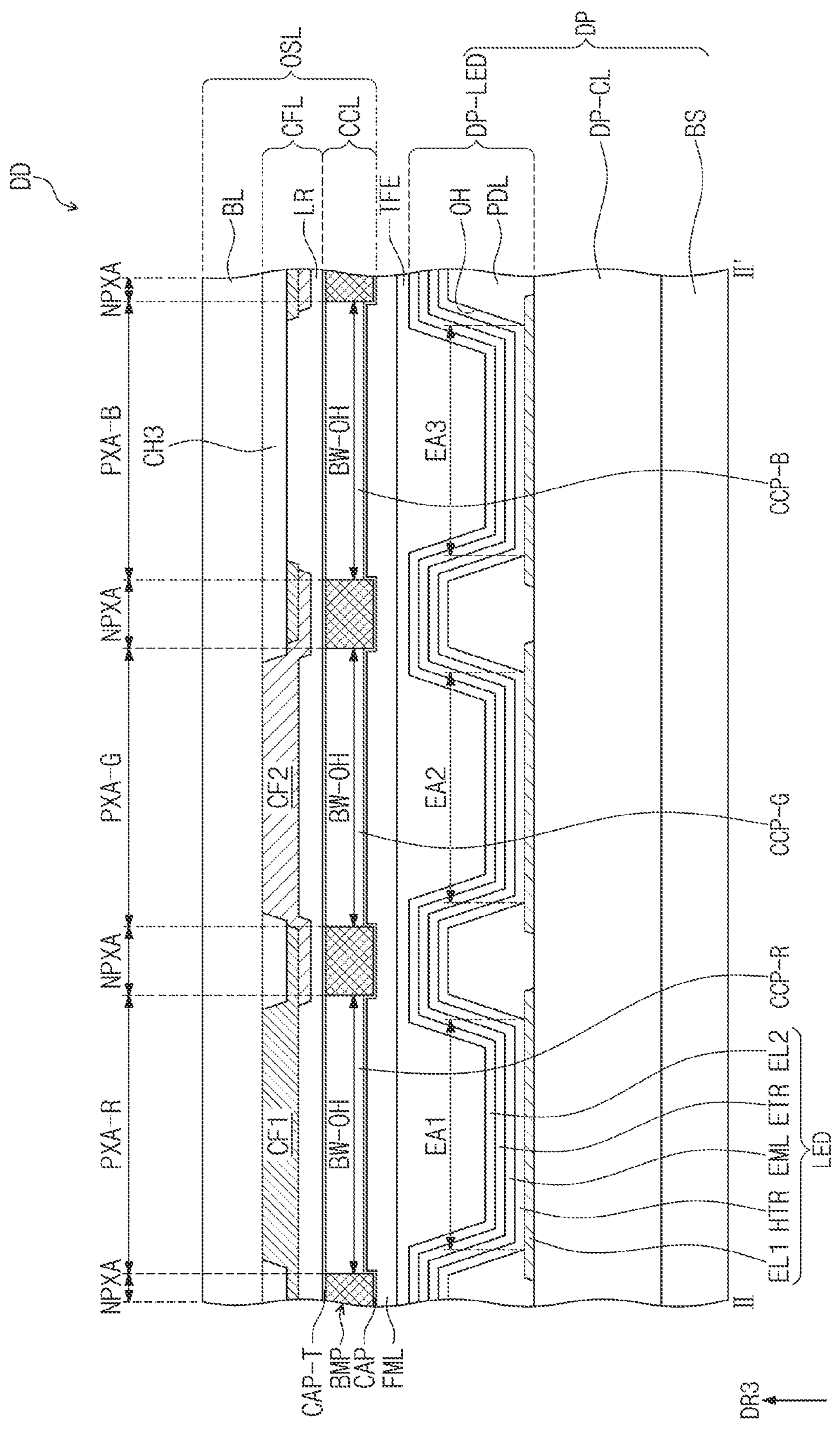
FIG. 2C is a cross-sectional view of a portion of a display panel according to an embodiment of the present disclosure.

FIG. 2B is a cross-sectional view of the display panel DP according to an embodiment of the present disclosure. FIG. 2C is a cross-sectional view of a portion of the display panel DP according to an embodiment of the present disclosure. FIG. 2B shows a cross-section taken along a line I-I' of FIG. 2A. FIG. 2C shows a cross-section taken along a line II-IF of FIG. 2A.

Referring to FIG. 2B, the display device DD may include the base substrate BS, the circuit element layer DP-CL disposed on the base substrate BS, and the display element layer DP-LED disposed on the circuit element layer DP-CL. In the present disclosure, the base substrate BS, the circuit element layer DP-CL, and the display element layer DP-LED may be collectively referred to as the display panel DP.

The base substrate BS may be a member that provides a base surface on which components included in the circuit element layer DP-CL are disposed. The base substrate BS may be a glass substrate, a metal substrate, or a polymer substrate. However, the embodiment should not be limited thereto or thereby, and the base substrate BS may be an inorganic layer, a functional layer, or a composite material layer.

The base substrate BS may have a multi-layer structure. For instance, the base substrate BS may have a three-layer structure of a polymer resin layer, an adhesive layer, and a polymer resin layer. The polymer resin layer may include a polyimide-based resin. In addition, the polymer resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In the present disclosure, the term "X-based resin", as used herein, refers to the resin that includes a functional group of X.

The circuit element layer DP-CL may be disposed on the base substrate BS. The circuit element layer DP-CL may include a transistor T-D as its circuit element. The configuration of the circuit element layer DP-CL may be changed according to a design of a driving circuit of the pixel PX (refer to FIG. 1A), and FIG. 2B shows the transistor T-D as a representative example. An arrangement relationship between an active A-D, a source S-D, a drain D-D, and a gate G-D that form the transistor T-D is shown in FIG. 2B. The active A-D, the source S-D, and the drain D-D may be distinguished from each other according to a doping concentration or a conductivity of a semiconductor pattern.

The circuit element layer DP-CL may include a lower buffer layer BRL, a first insulating layer 10, a second insulating layer 20, and a third insulating layer 30, which are disposed on the base substrate BS. For instance, each of the lower buffer layer BRL, the first insulating layer 10, and the second insulating layer 20 may be an inorganic layer, and the third insulating layer 30 may be an organic layer.

The display element layer DP-LED may include a light emitting element LED as its display element. The light emitting element LED may generate the source light. The light emitting element LED may include a first electrode EL1, a second electrode EL2, and a light emitting layer EML disposed between the first electrode EL1 and the second electrode EL2. In the present embodiment, the display element layer DP-LED may include an organic light emitting diode as its light emitting element. According to an embodiment, the light emitting element LED may include a quantum dot light emitting diode. That is, the light emitting layer EML included in the light emitting element LED may include an organic light emitting material as its light emitting material, or the light emitting layer EML may include a quantum dot as its light emitting material. According to an embodiment, the display element layer DP-LED may include a micro light emitting element described later as its light emitting element. The micro light emitting element may include, for example, a micro-LED element and/or a nano-LED element. The micro light emitting element may be a light emitting element having a microscale or nanoscale size and including an active layer disposed between a plurality of semiconductor layers.

The first electrode EL1 may be disposed on the third insulating layer 30. The first electrode EL1 may be directly or indirectly connected to the transistor T-D, and a connection structure between the first electrode EL1 and the transistor T-D is not shown in FIG. 2B.

The display element layer DP-LED may include the pixel definition layer PDL. For instance, the pixel definition layer PDL may be an organic layer. The pixel definition layer PDL may be provided with a light emitting opening OH defined therethrough. At least a portion of the first electrode EL1 may be exposed through the light emitting opening OH of the pixel definition layer PDL. In the present embodiment, a first light emitting area EA1 may be defined by the light emitting opening OH.

A hole control layer HTR, the light emitting layer EML, an electron control layer ETR may overlap at least the pixel area PXA-R. The hole control layer HTR, the light emitting layer EML, the electron control layer ETR, and the second electrode EL2 may be commonly disposed in the first, second, and third pixel areas PXA-R, PXA-G, and PXA-B (refer to FIG. 2C). Each of the hole control layer HTR, the light emitting layer EML, the electron control layer ETR, and the second electrode EL2, which overlaps the first, second, and third pixel areas PXA-R, PXA-G, and PXA-B, may have an integral shape, however, it should not be limited thereto or thereby. According to an embodiment, at least one of the hole control layer HTR, the light emitting layer EML, and the electron control layer ETR may be disposed in each of the first, second, and third pixel areas PXA-R, PXA-G, and PXA-B after being divided into plural portions. According to an embodiment, the light emitting layer EML may be formed in each of the first, second, and third pixel areas PXA-R, PXA-G, and PXA-B after being patterned in the light emitting opening OH.

The hole control layer HTR may include a hole transport layer and may further include a hole injection layer.

The light emitting layer EML may generate the third light as the source light. The light emitting layer EML may generate the blue light. The blue light may have a wavelength from about 410 nm to about 480 nm. A light emission spectrum of the blue light may have a maximum peak within a wavelength range from about 440 nm to about 460 nm.

The electron control layer ETR may include an electron transport layer and may further include an electron injection layer.

The display element layer DP-LED may include a thin film encapsulation layer TFE that protects the second electrode EL2. The thin film encapsulation layer TFE may include an organic material or an inorganic material. The thin film encapsulation layer TFE may have a multi-layer structure in which an inorganic layer and an organic layer are repeatedly stacked. In the present embodiment, the thin film encapsulation layer TFE may have a structure of a first encapsulation inorganic layer IOL1/an encapsulation organic layer OL/a second encapsulation inorganic layer IOL2. The first and second encapsulation inorganic layers IOL1 and IOL2 may protect the light emitting element LED from an external moisture, and the encapsulation organic layer OL may prevent the light emitting element LED from getting scratches due to foreign substances introduced during the manufacturing process. Although not shown in figures, the display panel DP may further include a refractive-index control layer disposed above the thin film encapsulation layer TFE to improve a light emission efficiency.

As shown in FIG. 2B, the optical structure layer OSL may be disposed on the thin film encapsulation layer TFE. The optical structure layer OSL may include the light control layer CCL, a color filter layer CFL, and a base layer BL. In the present disclosure, the optical structure layer OSL may be referred to as an upper panel or an optical substrate.

The light control layer CCL may be disposed on the display element layer DP-LED including the light emitting element LED. The light control layer CCL may include the bank BMP, the color control pattern CCP-R and a barrier layer CAP.

The bank BMP may include a base resin and additives. The base resin may include various resin compositions that are generally referred to as a binder. The additives may include coupling agents and/or photoinitiators. The additives may further include a dispersant.

The bank BMP may include a black coloring agent to block a light. The bank BMP may include a black dye or a black pigment mixed with the base resin. According to an embodiment, the black coloring agent may include a metal material, such as carbon black, chromium, or an oxide thereof.

The bank BMP may be provided with a bank opening BW-OH defined therethrough and corresponding to the light emitting opening OH. When viewed in a plane, the bank opening BW-OH may overlap the light emitting opening OH and may have a size greater than that of the light emitting opening OH. That is, the bank opening BW-OH may have a size greater than that of the first light emitting area EA1 defined by the light emitting opening OH. Meanwhile, in the present disclosure, the expression "an area/portion corresponds to another area/portion" means that "an area/portion overlaps another area/portion", and the "areas and portions" should not be limited to have the same size as each other.

The light control pattern CCP-R may be disposed inside the bank opening BW-OH. The light control pattern CCP-R may convert optical properties of the source light.

The light control pattern CCP-R may include a quantum dot to convert the optical properties of the source light. The light control pattern CCP-R may include the quantum dot to convert the source light to a light having another wavelength. The quantum dot included in the light control pattern CCP-R overlapping the first pixel area PXA-R may convert the blue light that is the source light into the red light.

Each quantum dot may have a core-shell structure, and the core of the quantum dot may be selected from a group II-VI compound, a group III-VI compound, a group compound, a group III-V compound, a group IV-VI compound, a group IV element, a group IV compound, and a combination thereof.

The group II-VI compound may be selected from a binary compound selected from the group consisting of CdSe, CdTe, CdS, ZnS, ZnSe, ZnTe, ZnO, HgS, HgSe, HgTe, MgSe, MgS, and a mixture thereof, a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The group III-VI compound may include a binary compound of $In_2S_3$ or $In_2Se_3$, a ternary compound of $InGaS_3$ or $InGaSe_3$, or an arbitrary combination thereof.

The group compound may include a ternary compound selected from the group consisting of AgInS, $AgInS_2$, CuInS, $CuInS_2$, $AgGaS_2$, $CuGaS_2$, $CuGaO_2$, $AgGaO_2$, $AgAlO_2$, and a mixture thereof, or a quaternary compound of $AgInGaS_2$, $CuInGaS_2$, or the like.

The group III-V compound may be selected from a binary compound selected from the group consisting of GaN, GaP, GaAs, GaSb, AlN, AlP, AlAs, AlSb, InN, InP, InAs, InSb, and a mixture thereof, a ternary compound selected from the group consisting of GaNP, GaNAs, GaNSb, GaPAs, GaPSb, AlNP, AlNAs, AlNSb, AlPAs, AlPSb, InGaP, InAlP, InNP, InNAs, InNSb, InPAs, InPSb, and a mixture thereof, and a quaternary compound selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group III-V compound may further include a group II metal. For instance, InZnP may be selected as a group III-II-V compound.

The group IV-VI compound may be selected from a binary compound selected from the group consisting of SnS, SnSe, SnTe, PbS, PbSe, PbTe, and a mixture thereof, a ternary compound selected from the group consisting of SnSeS, SnSeTe, SnSTe, PbSeS, PbSeTe, PbSTe, SnPbS, SnPbSe, SnPbTe, and a mixture thereof, and a quaternary compound selected from the group consisting of SnPbSSe, SnPbSeTe, SnPbSTe, and a mixture thereof. The group IV element may be selected from the group consisting of Si, Ge, and a mixture thereof. The group IV compound may be a binary compound selected from the group consisting of SiC, SiGe, and a mixture thereof.

In this case, the binary compound, the ternary compound, or the quaternary compound may exist in the particles at a uniform concentration or may exist in the same particle after being divided into plural portions having different concentrations. In addition, the quantum dots may have a core/shell structure in which one quantum dot surrounds another quantum dot. In the core/shell structure, the concentration of elements existing in the shell may have a concentration gradient that is lowered as the distance from the core decreases.

The quantum dot may have a core-shell structure that includes a core having the above-mentioned nanocrystal and a shell surrounding the core. The shell of the quantum dot may serve as a protective layer to prevent chemical modification of the core and to maintain semiconductor properties and/or may serve as a charging layer to impart electrophoretic properties to the quantum dot. The shell may have a single-layer or multi-layer structure. The shell of the quantum dots may include metal oxides or non-metal oxides, semiconductor compounds, or combinations thereof as its representative example.

The metal oxides or non-metal oxides may include a binary compound, such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, or a ternary compound, such as $MgAl_2O_4$, $CoFe_2O_4$, $NiFe_2O_4$, $CoMn_2O_4$, however, they should not be limited thereto or thereby.

In addition, the semiconductor compounds may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, however, they should not be limited thereto or thereby.

The quantum dot may have a full width of half maximum (FWHM) of a light emission wavelength spectrum of about 45 nm or less, preferably about 40 nm or less, and more preferably about 30 nm or less. The color purity and the color reproducibility may be improved within this range. In addition, since the light emitted through the quantum dots may be emitted in all directions, an optical viewing angle may be improved.

In addition, the shape of the quantum dot may have a shape commonly used in the art, however, it should not be particularly limited. In more detail, spherical, pyramidal, multi-arm, or cubic nanoparticles, nanotubes, nanowires, nanofibers, nanoplatelets, or the like may be applied to the quantum dots.

The quantum dot may control the color of the emitted light depending on a particle size thereof, and accordingly, the quantum dot may have various emission colors such as blue, green, and red colors. According to an embodiment, the quantum dot included in the light control pattern CCP-R overlapping the first pixel area PXA-R may have a red emission color. As the particle size of the quantum dot decreases, the wavelength of the light emitted from the quantum dot becomes shorter. For example, the particle size of the quantum dot emitting the green light may be smaller than the particle size of the quantum dot emitting the red light in the quantum dots having the same core. In addition, the particle size of the quantum dots emitting the blue light may be smaller than the particle size of the quantum dot emitting the green light in the quantum dots having the same core. However, the present disclosure should not be limited thereto or thereby, and in the quantum dots having the same core, the particle size may be adjusted depending on a material for the shell and a thickness of the shell.

Meanwhile, in the case where the quantum dots have various emission colors such as blue, red, green, etc., materials for cores of the quantum dots having different emission colors may be different from each other.

The light control pattern CCP-R may further include a scatterer. The light control pattern CCP-R may include the quantum dot converting the blue light to the red light and the scatterer scattering the light.

The scatterer may be an inorganic particle. As an example, the scatterer may include at least one of $TiO_2$, ZnO, $Al_2O_3$, $SiO_2$, and a hollow silica. The scatterer may include one of $TiO_2$, ZnO, $Al_2O_3$, $SiO_2$, and the hollow silica or may include a mixed material of two or more of $TiO_2$, ZnO, $Al_2O_3$, $SiO_2$, and the hollow silica.

The light control pattern CCP-R may include a base resin in which the quantum dot and the scatterer are dispersed. The base resin may be a medium in which the quantum dot and the scatterer are dispersed and may include various resin compositions that are generally referred to as a binder; however, this is not a limitation of the inventive concept. The base resin may be an acrylic-based resin, a urethane-based resin, a silicone-based resin, or an epoxy-based resin. The base resin may be a transparent resin.

In the present embodiment, the light control pattern CCP-R may be formed by an inkjet process. A liquid composition may be provided within the bank opening BW-OH. The composition that is polymerized by a thermal curing process or a light curing process is reduced in volume after curing. A process of forming the light control pattern CCP-R will be described with reference to FIG. 3.

There may be a step difference between a lower surface of the bank BMP and a lower surface of the light control pattern CCP-R. That is, lower surface of the bank BMP may be defined at a position lower than an lower surface of the light control pattern CCP-R. A difference in height between the lower surface of the bank BMP and the lower surface of the light control pattern CCP-R may be within a range from about 2 to about 3 μm.

The light control layer CCL may include the barrier layer CAP. The barrier layer CAP may prevent moisture and/or oxygen (hereinafter, referred to as moisture/oxygen) from entering. The barrier layer CAP may be disposed on or under the light control pattern CCP-R to prevent the light control pattern CCP-R from being exposed to the moisture/oxygen. In particular, the barrier layer CAP may prevent the quantum dots included in the light control pattern CCP-R from being exposed to the moisture/oxygen. In addition, the barrier layer CAP may protect the light control pattern CCP-R from external impacts.

According to an embodiment, the barrier layer CAP may be disposed adjacent to the display element layer DP-LED. That is, the barrier layer CAP may be disposed on the lower surface of the light control pattern CCP-R. According to an embodiment, the light control layer CCL may include an additional barrier layer CAP-T spaced apart from the display element layer DP-LED with the light control pattern CCP-R interposed therebetween. The barrier layer CAP may cover the lower surface of the light control pattern CCP-R adjacent to the display element layer DP-LED, and the additional barrier layer CAP-T may cover the upper surface of the light control pattern CCP-R adjacent to the color filter layer CFL. Meanwhile, in the present disclosure, the term "upper surface" may indicate a surface disposed at a relatively high position in the third direction DR3, and the term "lower surface" may indicate a surface disposed at a relatively low position in the third direction DR3.

In addition, the barrier layer CAP and the additional barrier layer CAP-T may cover the bank BMP as well as the light control pattern CCP-R.

The barrier layer CAP may be disposed corresponding to the step difference between the bank BMP and the light control pattern CCP-R. The additional barrier layer CAP-T may cover a surface of the bank BMP and a surface of the light control pattern CCP-R, which are adjacent to the color filter layer CFL. The additional barrier layer CAP-T may be disposed directly on a low refractive layer LR.

The barrier layer CAP and the additional barrier layer CAP-T may include an inorganic material. According to an embodiment, the barrier layer CAP of the display panel DP may include silicon oxynitride (SiON). The barrier layer CAP and the additional barrier layer CAP-T may include silicon oxynitride, however, they should not be limited thereto or thereby. According to an embodiment, the barrier layer CAP disposed under the light control pattern CCP-R may include silicon oxynitride, and the additional barrier layer CAP-T disposed on the light control pattern CCP-R may include silicon oxide (SiOx), however, the present disclosure should not be limited thereto or thereby.

Meanwhile, each of the barrier layer CAP and the additional barrier layer CAP-T may further include an organic layer. The barrier layers CAP and CAP-T may have a single-layer or multi-layer structure. In the barrier layers CAP and CAP-T, the inorganic layer may prevent the light control pattern CCP-R from the external moisture, and the organic layer may compensate for the step difference between the bank BMP and the light control pattern CCP-R and may provide a flat base surface to members disposed thereon.

The color filter layer CFL may be disposed on the light control layer CCL. The color filter layer CFL may include at least one color filter CF1. The color filter CF1 may transmit a light in a specific wavelength range and may block a light outside the specific wavelength range. The color filter CF1 of the first pixel area PXA-R may transmit the red light and may block the green light and the blue light.

The color filter CF1 may include a base resin and a dye and/or a pigment dispersed in the base resin. The base resin may be a medium in which the dye and/or the pigment are dispersed and may include various resin compositions that are generally referred to as a binder.

The color filter CF1 may have a uniform thickness in the first pixel area PXA-R. In the first pixel area PXA-R, the red light obtained by converting the blue light, which is the source light, through the light control pattern CCP-R may be provided to the outside at a uniform luminance.

The color filter layer CFL may include the low refractive layer LR. The low refractive layer LR may be disposed between the light control layer CCL and the color filter CF1. The low refractive layer LR may be disposed on the light control layer CCL to prevent the light control pattern CCP-R from being exposed to moisture/oxygen. In addition, the low refractive layer LR may be disposed between the light control pattern CCP-R and the color filter CF1 to serve as an optical functional layer that increases a light extraction efficiency or that prevents a reflected light from entering the light control layer CCL. The low refractive layer LR may have a refractive index smaller than that of layers adjacent thereto.

The low refractive layer LR may include at least one inorganic layer. For example, the low refractive layer LR may include silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride, or a metal thin film having the light transmittance. However, it should be understood that the inventive concept is not limited to these materials. According to an embodiment, the low refractive layer LR may include an organic layer. For example, the low refractive layer LR may include a polymer resin and inorganic particles. The low refractive layer LR may have a single-layer or multi-layer structure.

Meanwhile, the color filter CF1 of the color filter layer CFL may be disposed directly on the light control layer CCL in the display device DD. In this case, the low refractive layer LR may be omitted.

According to an embodiment, the display device DD may further include the base layer BL disposed on the color filter layer CFL. The base layer BL may provide a base surface on which the color filter layer CFL and the light control layer CCL are disposed. The base layer BL may be a glass substrate, a metal substrate, or a plastic substrate, although this is not a limitation of the inventive concept. According to an embodiment, the base layer BL may be an inorganic layer, an organic layer, or a composite material layer. In addition, according to an embodiment, the base layer BL may be omitted.

Although not shown in figures, an anti-reflective layer may be disposed on the base layer BL. The anti-reflective layer may reduce a reflectance with respect to an external light incident thereto from the outside. The anti-reflective layer may selectively transmit the light exiting from the display panel DP. According to an embodiment, the anti-reflective layer may have a single-layer structure including a base resin and a dye and/or a pigment dispersed in the base resin. The anti-reflective layer may be provided as a single continuous layer that entirely overlaps the first, second, and third pixel areas PXA-R, PXA-G, and PXA-B (refer to FIG. 2C).

The anti-reflective layer may not include a polarization layer. Accordingly, the light incident into the display element layer DP-LED after passing through the anti-reflective layer may be an unpolarized light. The display element layer DP-LED may receive the unpolarized light from the above of the anti-reflective layer.

The display device DD may include the display panel DP, i.e., a lower panel, including the display element layer DP-LED, and the optical structure layer OSL, i.e., an upper panel, including the light control layer CCL and the color filter layer CFL and a filling layer FML may be disposed between the display panel DP and the optical structure layer OSL. According to an embodiment, the filling layer FML may be filled in between the display element layer DP-LED and the light control layer CCL. The filling layer FML may be disposed directly on the thin film encapsulation layer TFE, and the barrier layer CAP included in the light control layer CCL may be disposed directly on the filling layer FML. A lower surface of the filling layer FML may be in contact with an upper surface of the thin film encapsulation layer TFE, and an upper surface of the filling layer FML may be in contact with a lower surface of the barrier layer CAP.

The filling layer FML may function as a buffer between the display element layer DP-LED and the light control layer CCL. According to an embodiment, the filling layer FML may have an impact absorbing function and may increase a strength of the display panel DP. The filling layer FML may be formed of a filling resin including a polymer resin. As an example, the filling layer FML may be formed of a resin, such as an acrylic-based resin or an epoxy-based resin.

The filling layer FML may be formed through a separate process from the thin film encapsulation layer TFE disposed thereunder and the barrier layer CAP disposed thereon. Meanwhile, the filling layer FML may be formed of a material different from those of the thin film encapsulation layer TFE and the barrier layer CAP.

Referring to FIG. 2C, the display device DD may include the base substrate BS and the circuit element layer DP-CL disposed on the base substrate BS. The circuit element layer DP-CL may be disposed on the base substrate BS. The circuit element layer DP-CL may include an insulating layer, a semiconductor pattern, a conductive pattern, and a signal line. An insulating layer, a semiconductor layer, and a conductive layer may be formed on the base substrate BS by a coating or depositing process. Then, the insulating layer, the semiconductor layer, and the conductive layer may be selectively patterned through several photolithography processes. The semiconductor pattern, the conductive pattern, and the signal line included in the circuit element layer DP-CL may be formed. The circuit element layer DP-CL may include a transistor, a buffer layer, and a plurality of insulating layers.

The light emitting element LED may include the first electrode EL1, the second electrode EL2 facing the first electrode EL1, and the light emitting layer EML disposed between the first electrode EL1 and the second electrode EL2. The light emitting layer EML included in the light emitting element LED may include the organic light emitting material or the quantum dot as its light emitting material. In addition, the light emitting element LED may further include the hole control layer HTR and the electron control layer ETR. Meanwhile, although not shown in figures, the light emitting element LED may further include a capping layer (not shown) disposed on the second electrode EL2.

The pixel definition layer PDL may be disposed on the circuit element layer DP-CL and may cover a portion of the first electrode EL1. The pixel definition layer PDL may be provided with the light emitting opening OH defined therethrough. At least the portion of the first electrode EL1 may be exposed through the light emitting opening OH of the pixel definition layer PDL. In the present embodiment, the light emitting areas EA1, EA2, and EA3 may be defined to respectively correspond to the portions of the first electrode EL1 exposed through the light emitting opening OH.

The display element layer DP-LED may include the first light emitting area EA1, a second light emitting area EA2, and a third light emitting area EA3. The first light emitting area EA1, the second light emitting area EA2, and the third light emitting area EA3 may be distinguished from each other by the pixel definition layer PDL. The first light emitting area EA1, the second light emitting area EA2, and the third light emitting area EA3 may correspond to the first pixel area PXA-R, the second pixel area PXA-G, and the third pixel area PXA-B, respectively.

The light emitting areas EA1, EA2, and EA3 may overlap the pixel areas PXA-R, PXA-G, and PXA-B and may not overlap the bank well area BWA. When viewed in a plane, the size of the pixel areas PXA-R, PXA-G, and PXA-B distinguished from each other by the bank BMP may be greater than the size of the light emitting areas EA1, EA2, and EA3 distinguished from each other by the pixel definition layer PDL.

The first electrode EL1 of the light emitting element LED may be disposed on the circuit element layer DP-CL. The first electrode EL1 may be an anode or a cathode. According to an embodiment, the first electrode EL1 may be a pixel electrode. The first electrode EL1 may be a transmissive electrode, a transflective electrode, or a reflective electrode.

The hole control layer HTR may be disposed between the first electrode EL1 and the light emitting layer EML. The hole control layer HTR may include at least one of a hole injection layer, a hole transport layer, and an electron blocking layer. The hole control layer HTR may be disposed as a common layer to entirely cover the light emitting areas EA1, EA2, and EA3 and the pixel definition layer PDL that distinguishes the light emitting areas EA1, EA2, and EA3 from each other. However, this is not a limitation of the present disclosure. According to an embodiment, the hole control layer HTR may be patterned to cover each of the light emitting areas EA1, EA2, and EA3.

The light emitting layer EML may be disposed on the hole control layer HTR. According to an embodiment, the light emitting layer EML may be provided as a common layer to entirely overlap the light emitting areas EA1, EA2, and EA3 and the pixel definition layer PDL that separates the light emitting areas EA1, EA2, and EA3 from each other. According to an embodiment, the light emitting layer EML may emit blue light. The light emitting layer EML may entirely cover the hole control layer HTR and the electron control layer ETR.

The present disclosure should not be limited to what is specifically described. For example, according to an embodiment, the light emitting layer EML may be disposed in the light emitting opening OH. That is, the light emitting layer EML may be provided after being divided into plural portions to correspond to the light emitting areas EA1, EA2, and EA3, which are distinguished from each other by the pixel definition layer PDL. In the light emitting layer EML divided into plural portions to correspond to the light emitting areas EA1, EA2, and EA3, all the portions of the light emitting layer EML may emit blue light or the portions of the light emitting layer EML may emit lights in different wavelength ranges from each other.

The light emitting layer EML may have a single-layer structure of a single material, a single-layer structure of plural different materials, or a multi-layer structure of layers formed of different materials. The light emitting layer EML may include a fluorescent or phosphorescent material. According to an embodiment, the light emitting layer EML may include an organic light emitting material, a metal organic complex, or a quantum dot as its light emitting material. Meanwhile, FIGS. 2B and 2C show the light emitting element LED including one light emitting layer EML, however, according to an embodiment, the light emitting element LED may include a plurality of emission stacks each of which includes at least one light emitting layer.

Figure 3:
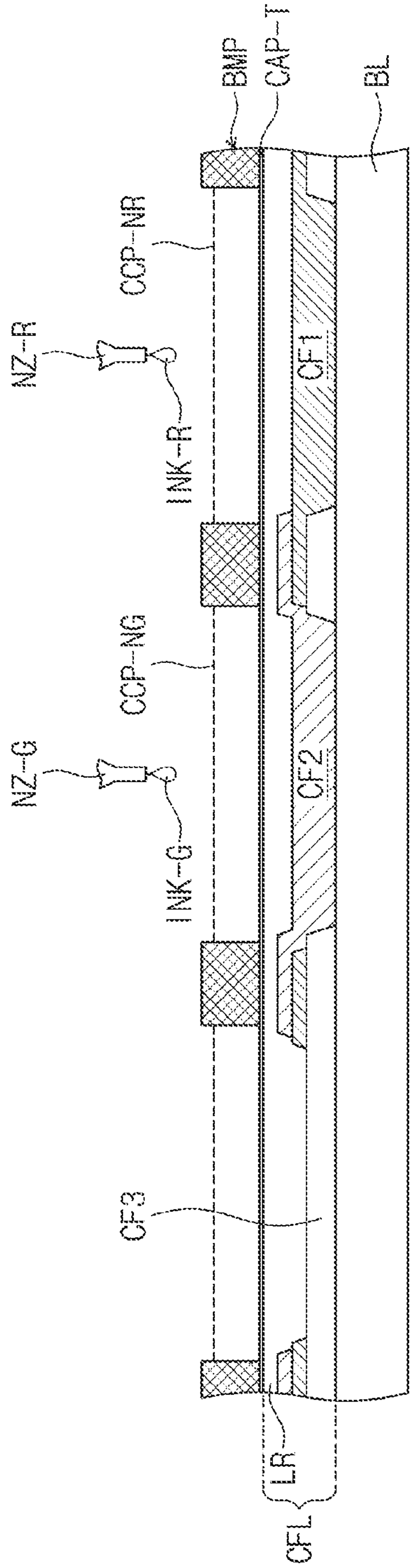
FIG. 3 is a cross-sectional view of a method of manufacturing a display device according to an embodiment of the present disclosure.

FIG. 3 is a cross-sectional view of a method of manufacturing the display device according to an embodiment of the present disclosure. FIG. 3 shows a process of printing a quantum dot composition on a target substrate to form the light control pattern in the manufacturing method of the display device.

Referring to FIGS. 2C and 3, the bank openings BW-OH may be defined between the banks BMP to respectively correspond to the first pixel area PXA-R, the second pixel area PXA-G, and the third pixel area PXA-B, and the light control patterns CCP-R, CCP-G, and CCP-B may be defined in the bank openings BW-OH, respectively.

A first pixel ink INK-R may be provided inside the bank opening BW-OH overlapping the first pixel area PXA-R by a first pixel nozzle NZ-R, and a second pixel ink INK-G may be provided inside the bank opening BW-OH overlapping the second pixel area PXA-G by a second pixel nozzle NZ-G. Each of the first pixel ink INK-R and the second pixel ink INK-G may be a composition containing the nanoparticles such as the quantum dot and the scatterer. The first pixel ink INK-R may include a red quantum dot and the scatterer, and the second pixel ink INK-G may include a green quantum dot and the scatterer. According to the manufacturing method of the display device, a thermal curing process or a light curing process may be performed on the compositions provided in the bank openings BW-OH respectively overlapping the first pixel area PXA-R and the second pixel area PXA-G, and thus, the first light control pattern CCP-R and the second light control pattern CCP-G may be formed.

Each of the first pixel ink INK-R and the second pixel ink INK-G may be provided using the inkjet process. The first pixel nozzle NZ-R and the second pixel nozzle NZ-G, which respectively provide the first pixel ink INK-R and the second pixel ink INK-G, may be included in an inkjet printing device described later, may receive the compositions containing the nanoparticles from a chamber, and may provide the compositions to the bank openings BW-OH. Each of the first pixel nozzle NZ-R and the second pixel nozzle NZ-G may include a plurality of nozzles.

The composition including the quantum dot may not be provided in the bank opening BW-OH overlapping the third pixel area PXA-B. The composition that includes only the scatterer without including the quantum dot may be provided in the bank opening BW-OH overlapping the third pixel area PXA-B, and the composition may be cured to form the third light control pattern CCP-B. When the source light generated by the light emitting element LED is the blue light, the blue light may travel to the third color filter CF3 after passing through the third light control pattern CCP-B in the third pixel area PXA-B even though a liquid quantum dot composition including a blue quantum dot is not used. However, this is not a limitation of the inventive concept.

According to an embodiment, the composition including the quantum dot may be provided in the bank opening BW-OH in the third pixel area PXA-B, and the pixel ink provided in the bank opening BW-OH overlapping the third pixel area PXA-B may include the blue quantum dot.

Figure 4A:
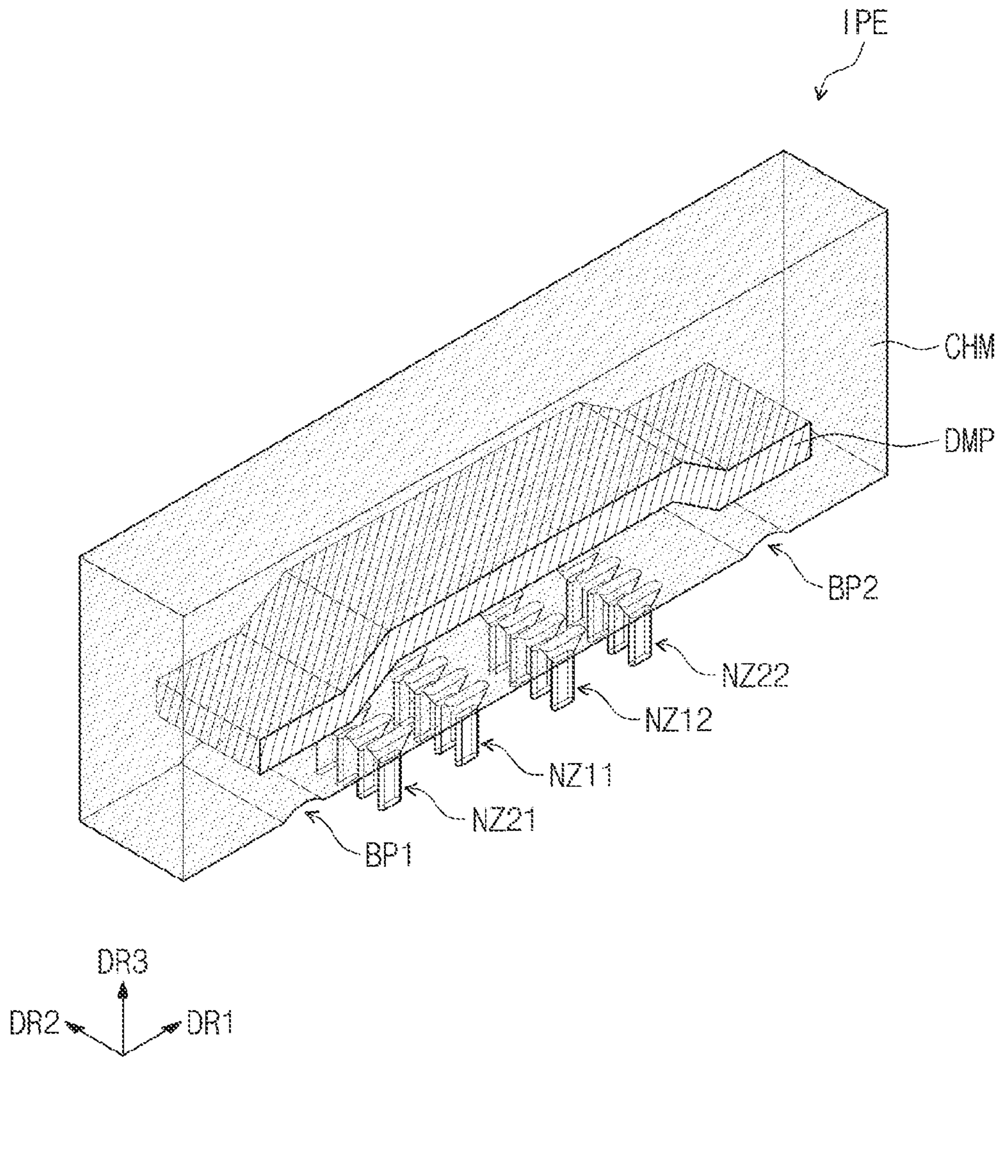
FIG. 4A is a perspective view of an inkjet printing device according to an embodiment of the present disclosure.
Figure 4B:
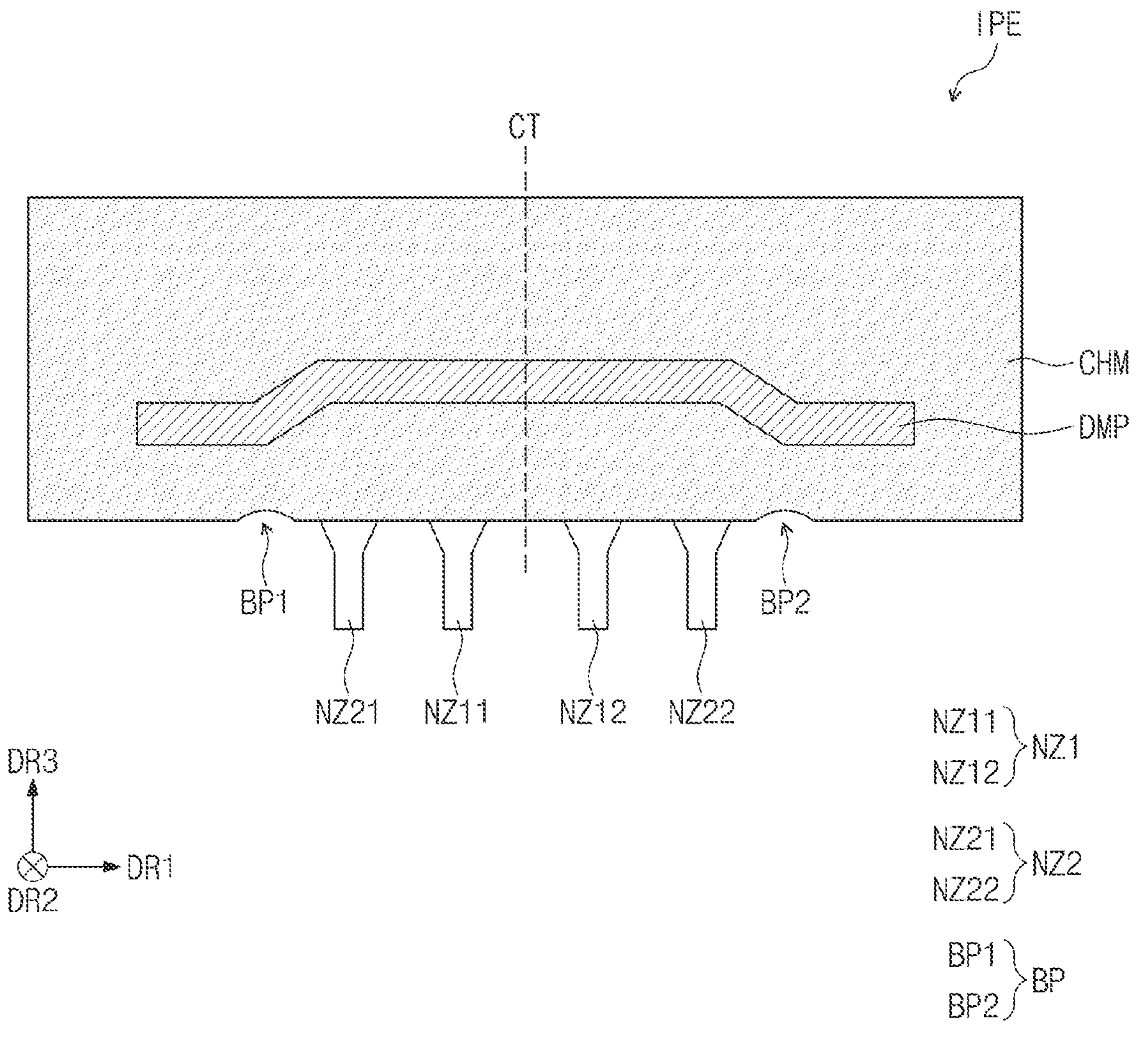
FIG. 4B is a cross-sectional view of an inkjet printing device according to an embodiment of the present disclosure.

FIG. 4A is a perspective view of an inkjet printing device IPE according to an embodiment of the present disclosure. FIG. 4B is a cross-sectional view of the inkjet printing device IPE according to an embodiment of the present disclosure.

The inkjet printing device IPE may be a device that ejects ink onto an object to be printed by an inkjet printing method. For instance, the inkjet printing device IPE may be a device that provides the composition containing nanoparticles to form the light control patterns CCP-R, CCP-G, and CCP-B in the optical structure layer OSL (refer to FIG. 2C) described above.

Referring to FIGS. 4A and 4B, the inkjet printing device IPE may include the chamber CHM, a plurality of inkjet nozzles NZ1 and NZ2 connected to the chamber CHM, and a damper member DMP disposed in the chamber CHM.

The chamber CHM may hold the ink to be supplied to the inkjet nozzles NZ1 (which include nozzles NZ11 and NZ12) and NZ2 (which include nozzles NZ21 and NZ22) and may supply the ink to the inkjet nozzles NZ1 and NZ2 at a predetermined pressure. That is, the chamber CHM may be a pressure chamber, and the ink may be discharged to the inkjet nozzles NZ1 and NZ2 by a pressure formed in the chamber CHM. Although not shown in figures, a supply portion supplying the ink and a control portion controlling an operation of the inkjet printing device IPE may be connected to the chamber CHM. In addition, the inkjet printing device IPE may further include an inlet passage connecting each component included in the inkjet printing device IPE.

The inkjet nozzles NZ1 and NZ2 may be connected to a lower end of the chamber CHM. The inkjet nozzles NZ1 and NZ2 may be arranged in the first direction DR1 and may be arranged in plural columns. FIGS. 4A and 4B show a structure in which the inkjet nozzles NZ1 and NZ2 are arranged in four columns along the first direction DR1 as a representative example. However, this is not a limitation of the present disclosure. For example, according to another embodiment, the inkjet nozzles NZ1 and NZ2 may be arranged in two, three, five, or more columns.

The inkjet nozzles NZ1 and NZ2 may include a center column nozzle NZ1 disposed near a center of the chamber CHM with respect to the first direction DR1 and an outer column nozzle NZ2 disposed at a relatively outer position of the chamber CHM (i.e., farther from the center than the center column nozzle NZ1). In one embodiment, the center column nozzle NZ1 may be disposed adjacent to a center line CT that is an imaginary line crossing a center of the chamber CHM along the third direction DR3, and the outer column nozzle NZ2 may be disposed spaced apart from the center line CT with the center column nozzle NZ1 interposed therebetween. The outer column nozzle NZ2 may be a nozzle disposed at an outermost position among the inkjet nozzles NZ1 and NZ2. That is, the outer column nozzle NZ2 may be the nozzle farthest away from the center line CT among the inkjet nozzles NZ1 and NZ2.

The center column nozzle NZ1 may be provided in plural columns. According to an embodiment, the center column nozzle NZ1 may include a first center column nozzle NZ11 disposed at one side of the center line CT and a second center column nozzle NZ12 disposed at the other side of the center line CT. The outer column nozzle NZ2 may be provided in plural columns. According to an embodiment, the outer column nozzle NZ2 may include a first outer column nozzle NZ21 disposed at a left side of the first center column nozzle NZ11 and a second outer column nozzle NZ22 disposed at a right side of the second center column nozzle NZ12. Although four columns of nozzles are depicted in the example, this is not a limitation of the disclosure.

The damper member DMP may be disposed in the chamber CHM and may be disposed above the inkjet nozzles NZ1 and NZ2. The damper member DMP may be disposed to overlap the inkjet nozzles NZ1 and NZ2. The damper member DMP may be disposed to overlap all the center column nozzle NZ1 and the outer column nozzle NZ2. As shown in FIG. 4B, the damper member DMP may have a partially bent shape such that the damper member DMP may be relatively farther away from a lower surface of the chamber CHM in an area overlapping the center line CT and the damper member DMP may become closer to the lower surface of the chamber CHM when a distance from the center line CT increases. However, this is not a limitation of the inventive concept. According to an embodiment, the chamber CHM may have a flat plate shape substantially parallel to a plane defined by the first direction DR1 and the second direction DR2.

When the ink is discharged to the inkjet nozzles NZ1 and NZ2 due to the pressure formed in the chamber CHM, the damper member DMP may prevent the pressure applied to a specific nozzle among the inkjet nozzles NZ1 and NZ2 from affecting another nozzle adjacent to the specific nozzle. In more detail, in a case where a portion of the ink flows back into the chamber CHM due to a force formed inside the nozzle when the ink is discharged from a specific nozzle by the pressure formed in the chamber CHM, the ink that flows back may affect a flow of the ink discharged from another nozzle adjacent to the specific nozzle. According to the inkjet printing device IPE, as the damper member DMP is disposed above the inkjet nozzles NZ1 and NZ2, the ink that flows back may collide with the damper member DMP, and thus, the pressure formed by the flow of the ink that flows back may be absorbed by the damper member DMP. Accordingly, the pressure applied to the specific nozzle may be prevented from affecting another nozzle adjacent to the specific nozzle, and an ink discharge efficiency of the inkjet printing device IPE may be improved.

The damper member DMP may be formed of a synthetic resin film. The damper member DMP may be a box-shaped member in which a gas is sealed, and a sealing member to seal the gas may be formed of the synthetic resin film.

In the inkjet printing device IPE, the chamber CHM may include a bump portion BP adjacent to the outer column nozzle NZ2. The bump portion BP may be disposed adjacent to the outer column nozzles NZ2 disposed at the outermost position among the inkjet nozzles NZ1 and NZ2. The bump portion BP may include a first bump portion BP1 disposed adjacent to the first outer column nozzle NZ21 and a second bump portion BP2 disposed adjacent to the second outer column nozzle NZ22.

The bump portion BP includes an elongated bump on an inner surface of the chamber CHM. In some embodiments, the bump portion BP may be a recessed portion on the lower surface of the chamber CHM when viewed in a cross-section, as depicted in FIG. 4A and FIG. 4B. According to an embodiment, each of the inkjet nozzles NZ1 and NZ2 may have a shape extending from the lower surface of the chamber CHM to a direction opposite to the third direction DR3, i.e., a downward direction, and the bump portion BP may have the shape recessed in the upward direction that is the third direction DR3 opposite to the extension direction of the inkjet nozzles NZ1 and NZ2. The bump portion BP may have a circular arc shape having a predetermined curvature in cross-section. However, the present disclosure should not be limited to the specific embodiments described, and the bump portion BP may have a variety of shapes. For example, the bump portion BP may have an elliptical arc shape or a polygonal shape with a hypotenuse. Meanwhile, FIGS. 4A and 4B show a structure in which the bump portion BP is formed as a recessed portion on the lower surface of the chamber CHM. This is a representative example, however, and not a limitation of the present disclosure. The bump portion BP may be formed by placing a separate member on the inner surface of the chamber CHM. Meanwhile, in the case where the bump portion BP is formed using the separate member, an upper surface of the bump portion BP may have the circular arc shape with a predetermined curvature shown in FIGS. 4A and 4B and the outer surface of the chamber CHM will be flat, without a recessed portion.

Figure 5:
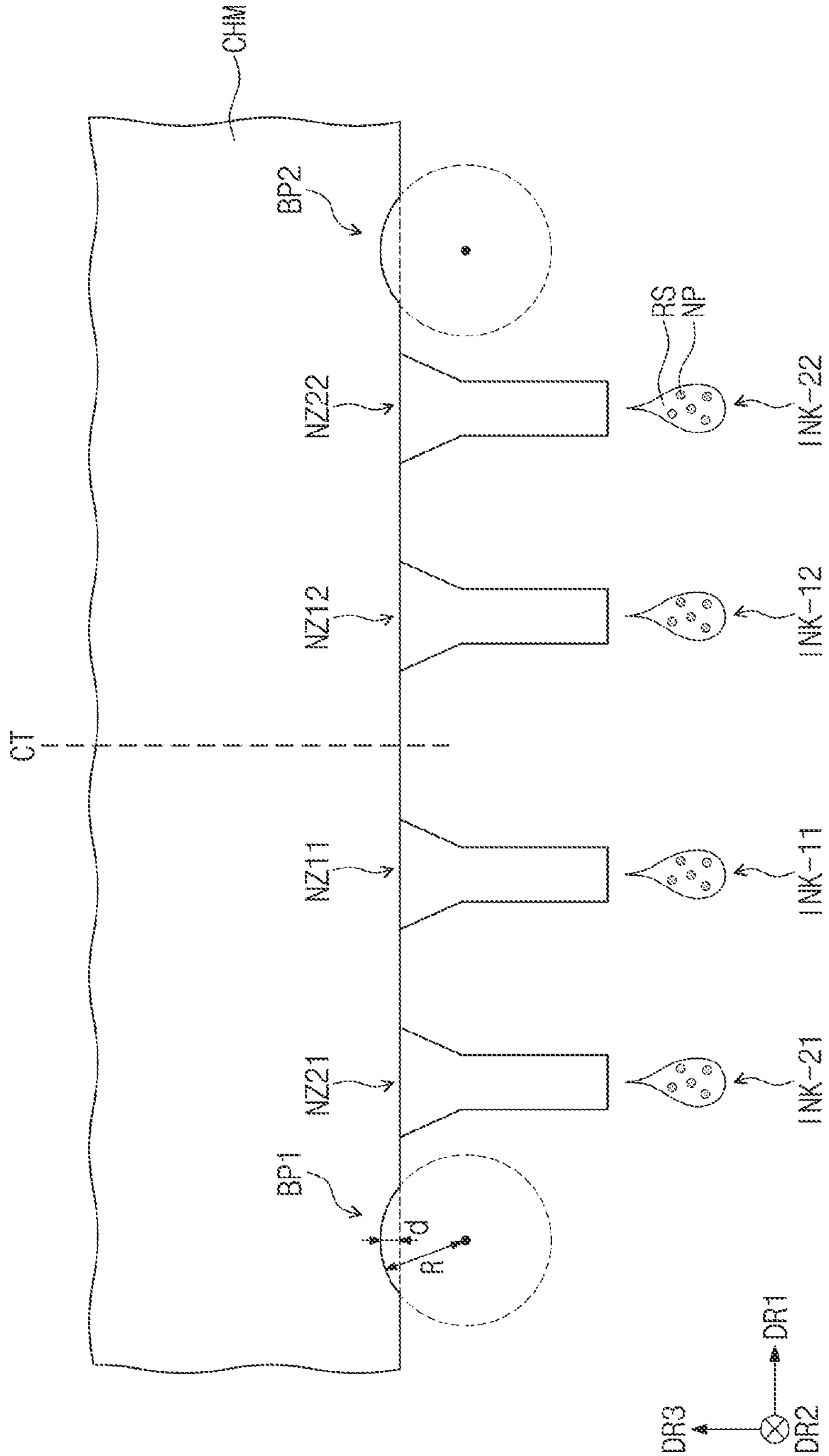
FIG. 5 is an enlarged cross-sectional view of an inkjet printing device according to an embodiment of the present disclosure.
Figure 6:
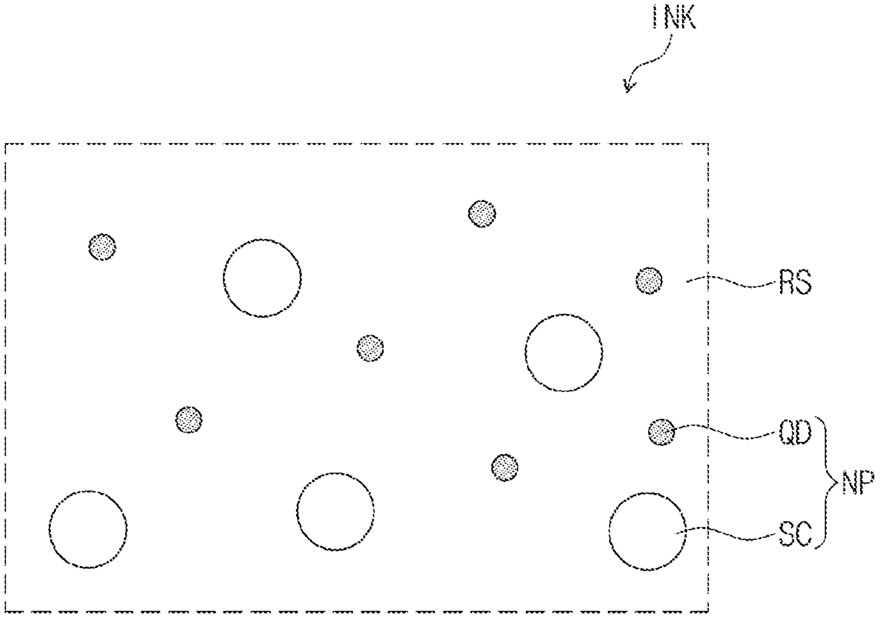
FIG. 6 is a cross-sectional view of an ink provided by an inkjet printing device according to an embodiment of the present disclosure.

FIG. 5 is an enlarged cross-sectional view of the inkjet printing device according to an embodiment of the present disclosure. FIG. 6 is a cross-sectional view of the ink provided by the inkjet printing device according to an embodiment of the present disclosure.

Referring to FIGS. 4B and 5, the inkjet printing device IPE may include the inkjet nozzles NZ1 and NZ2 and the bump portion BP, and the bump portion BP may have the circular arc shape with the predetermined curvature.

The shape and the curvature R of the bump portion BP may be designed in a range that is appropriate to control a path of the nanoparticles in the ink using the bump portion BP as described later. According to an embodiment, the curvature R of the bump portion BP may be equal to or greater than about 200 micrometers and equal to or smaller than about 600 micrometers. In addition, the bump portion BP may have a height d equal to or greater than about 50 micrometers and equal to or smaller than about 300 micrometers. As the curvature R and the height d of the bump portion BP are designed in the above range, the path of the nanoparticles in the ink may be appropriately adjusted, and thus, the nanoparticles may be uniformly supplied to the center column nozzle NZ1 and the outer column nozzle NZ2. This will be described in detail later.

Referring to FIGS. 5 and 6, the inkjet nozzles NZ1 and NZ2 may discharge inks INK-11, INK-12, INK-21, and INK-22 provided from the chamber CHM. Each of the inks INK-11, INK-12, INK-21, and INK-22 may include a base resin RS and a plurality of nanoparticles NP dispersed in the base resin RS. Meanwhile, the volume number density of the nanoparticles NP included in the inks INK-11, INK-12, INK-21, and INK-22 discharged from the inkjet nozzles NZ1 and NZ2 may be substantially the same. That is, the inks INK-11, INK-12, INK-21, and INK-22 discharged from the inkjet nozzles NZ1 and NZ2 may have substantially the same concentration of the inorganic nanoparticles as each other. Meanwhile, the term "substantially the same", as used herein in relation to the quantity and the concentration of the nanoparticles, means not only that the numbers and the concentration of the nanoparticles are physically exactly the same in each ink but also that the numbers and the concentration of the nanoparticles in each ink are within an acceptable process tolerance.

According to an embodiment, first inks INK-11 and INK-12 may be discharged from the center column nozzle NZ11 and NZ12, and second inks INK-21 and INK-22 may be discharged from the outer column nozzle NZ21 and NZ22. The volume number density of the nanoparticles NP included in the first inks INK-11 and INK-12 may be substantially the same as the volume number density of the nanoparticles included in the second inks INK-21 and INK-22. The concentration of the nanoparticles NP in the first inks INK-11 and INK-12 may be substantially the same as the concentration of the nanoparticles NP in the second inks INK-21 and INK-22.

The nanoparticles NP may include inorganic nanoparticles. According to an embodiment, the nanoparticles NP may include the quantum dot QD and the scatterer SC, which are described with reference to FIGS. 2B and 2C.

The quantum dot QD may be a luminescent particle that converts the source light into a light having a different wavelength. The quantum dot QD may have the core-shell structure, and the core of the quantum dot may be selected from the group of II-VI compound, the group of III-VI compound, the group of compound, the group of III-V compound, the group of IV-VI compound, the group of IV element, the group of IV compound, and a combination thereof. The above descriptions on the quantum dot with reference to FIGS. 2B and 2C may be applied to the quantum dot QD.

The scatterer SC may scatter the light to improve a light emission efficiency. The scatterer SC may include at least one of $TiO_2$, ZnO, $Al_2O_3$, $SiO_2$, and the hollow silica. As an example, the scatterer SC may include $TiO_2$. The above descriptions on the scatterer with reference to FIGS. 2B and 2C may be applied to the scatterer SC.

The base resin RS may be a medium in which luminous materials are dispersed and may include various resin compositions that are generally referred to as a binder. However, it should be understood that this is not a limitation of the present disclosure. In the present disclosure, a medium may be selected as the base resin RS regardless of its name, additional functions, or constituent materials as long as the nanoparticles NP are able to be dispersed in the medium. The base resin RS may be a polymer resin. As an example, the base resin RS may be an acrylic-based resin, a urethane-based resin, a silicone-based resin, or an epoxy-based resin. The base resin may be a transparent resin.

Figure 7A:
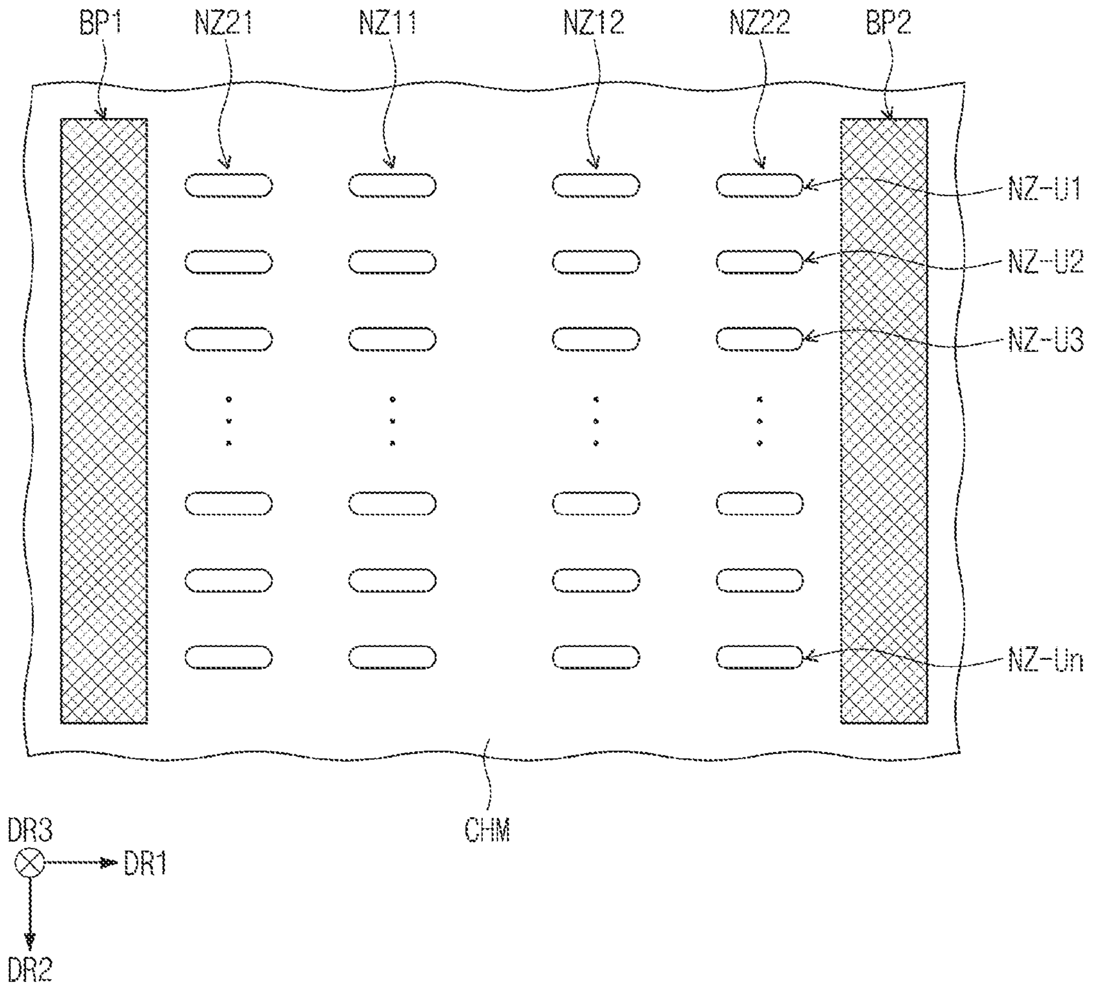
FIGS. 7A to 7C are bottom views of a portion of an inkjet printing device according to embodiments of the present disclosure.
Figure 7B:
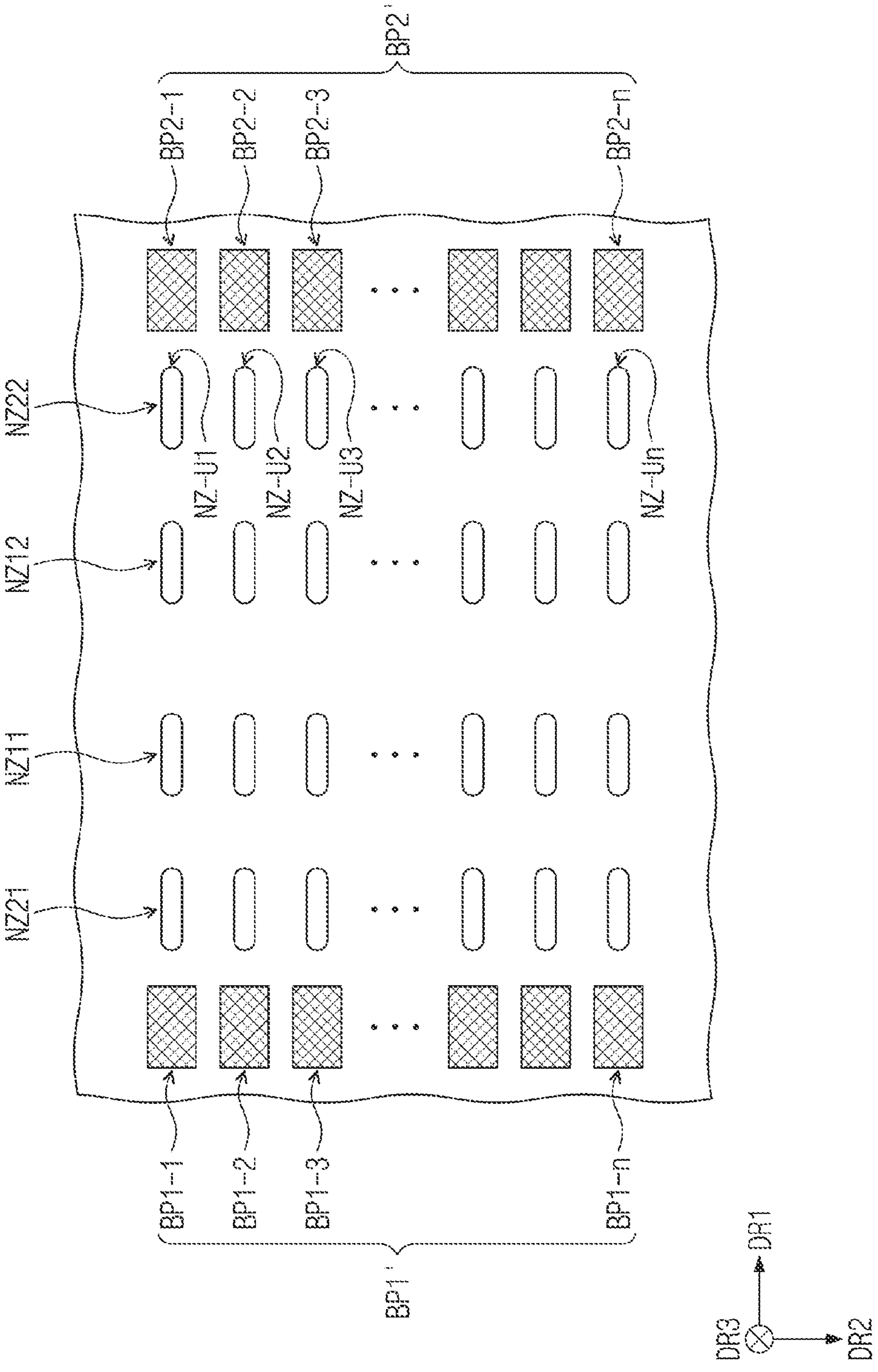
Figure 7C:
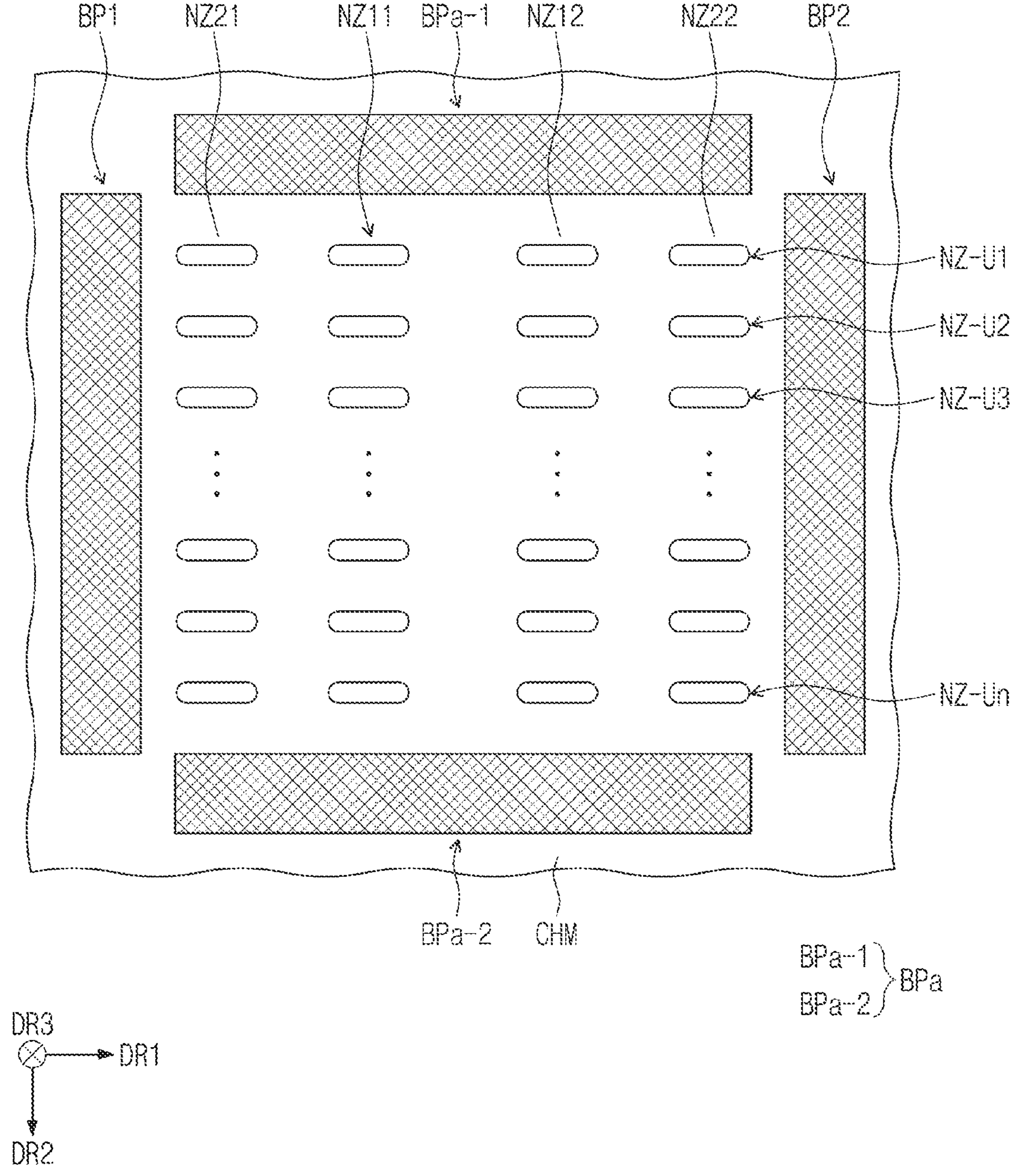

FIGS. 7A to 7C are bottom views of a portion of the inkjet printing device IPE according to embodiments of the present disclosure. FIGS. 7A to 7C are plan views of inkjet nozzles NZ11, NZ12, NZ21, and NZ22 disposed on a lower surface of the chamber CHM and bump portions BP1 and BP2 formed on the lower surface of the chamber CHM in the inkjet printing device IPE.

Referring to FIGS. 4B and 7A to 7C, the inkjet printing device IPE may include the inkjet nozzles NZ11, NZ12, NZ21, and NZ22 arranged in plural columns, and each of the inkjet nozzles NZ11, NZ12, NZ21, and NZ22 may include a plurality of unit nozzles NZ-U1, NZ-U2, NZ-U3, . . . , and NZ-Un arranged in a plurality of rows along the second direction DR2. According to an embodiment, each of the center column nozzles NZ11 and NZ12 and each of the outer column nozzles NZ21 and NZ22 may include the unit nozzles NZ-U1, NZ-U2, NZ-U3, . . . , NZ-Un arranged in the rows along the second direction DR2.

Referring to FIG. 7A, each of the bump portions BP1 and BP2 formed on the lower surface of the chamber CHM may be disposed to overlap all the unit nozzles NZ-U1, NZ-U2, NZ-U3, . . . , NZ-Un in the first direction DR1. That is, each of the bump portions BP1 and BP2 may have a shape extending in the second direction DR2, and thus, each of the bump portions BP1 and BP2 formed on the lower surface of the chamber CHM may be disposed to overlap all the unit nozzles NZ-U1, NZ-U2, NZ-U3, . . . , NZ-Un in the first direction DR1.

Referring to FIG. 7B, bump portions BP1' and BP2' may include a plurality of unit bump portions BP1-1, BP1-2, BP1-3, . . . , BP1-*n* and BP2-1, BP2-2, BP2-3, . . . , BP2-*n*. The bump portion BP1' may include the unit bump portions BP1-1, BP1-2, BP1-3, . . . , BP1-*n* arranged respectively corresponding to a plurality of unit nozzles NZ-U1, NZ-U2, NZ-U3, . . . , NZ-Un. The bump portion BP2' may include the unit bump portions BP2-1, BP2-2, BP2-3, . . . , BP2-*n* arranged respectively corresponding to the unit nozzles NZ-U1, NZ-U2, NZ-U3, . . . , NZ-Un. The unit bump portions BP1-1, BP1-2, BP1-3, . . . , BP1-*n* may be disposed corresponding to rows in which the unit nozzles NZ-U1, NZ-U2, NZ-U3, . . . , NZ-Un are arranged, respectively. The unit bump portions BP2-1, BP2-2, BP2-3, . . . , BP2-*n* may be disposed corresponding to the rows in which the unit nozzles NZ-U1, NZ-U2, NZ-U3, . . . , NZ-Un are arranged, respectively. According to an embodiment, first unit bump portions BP1-1 and BP2-1 may be arranged corresponding to first unit nozzles NZ-U1 arranged in a first row, second unit bump portions BP1-2 and BP2-2 may be arranged corresponding to second unit nozzles NZ-U2 arranged in a second row, third unit bump portions BP1-3 and BP2-3 may be arranged corresponding to third unit nozzles NZ-U3 arranged in a third row, and n-th unit bump portions BP1-*n* and BP2-*n* may be arranged corresponding to n-th unit nozzles NZ-Un arranged in an n-th row. Meanwhile, a first bump portion BP1' adjacent to a first outer column nozzle NZ21 may include a plurality of first-column unit bump portions BP1-1, BP1-2, BP1-3, . . . , BP1-*n*, and a second bump portion BP2' adjacent to a second outer column nozzle NZ22 may include a plurality of second-row unit bump portions BP2-1, BP2-2, BP2-3, . . . , BP2-*n*. However, this is not a limitation of the present disclosure, and one of the first bump portion BP1' and the second bump portion BP2' may not include the unit bump portions and may be provided as one bump portion extending in the second direction DR2 as shown in FIG. 7A.

Referring to FIG. 7C, the inkjet printing device may further include an additional bump portion BPa. The additional bump portion BPa may be disposed adjacent to an outer row unit nozzle disposed at an outermost position in the second direction DR2 among a plurality of unit nozzles NZ-U1, NZ-U2, NZ-U3, . . . , NZ-Un. In the embodiment shown in FIG. 7C, first unit nozzles NZ-U1 and n-th unit nozzles NZ-Un may correspond to the outer-row unit nozzles, and the additional bump portion BPa may be disposed adjacent to each of the first unit nozzles NZ-U1 and the n-th unit nozzles NZ-Un. The additional bump portion BPa may include a first additional bump portion BPa-1 disposed adjacent to the first unit nozzles NZ-U1 and a second additional bump portion BPa-2 disposed adjacent to the n-th unit nozzles NZ-Un.

Figure 8A:
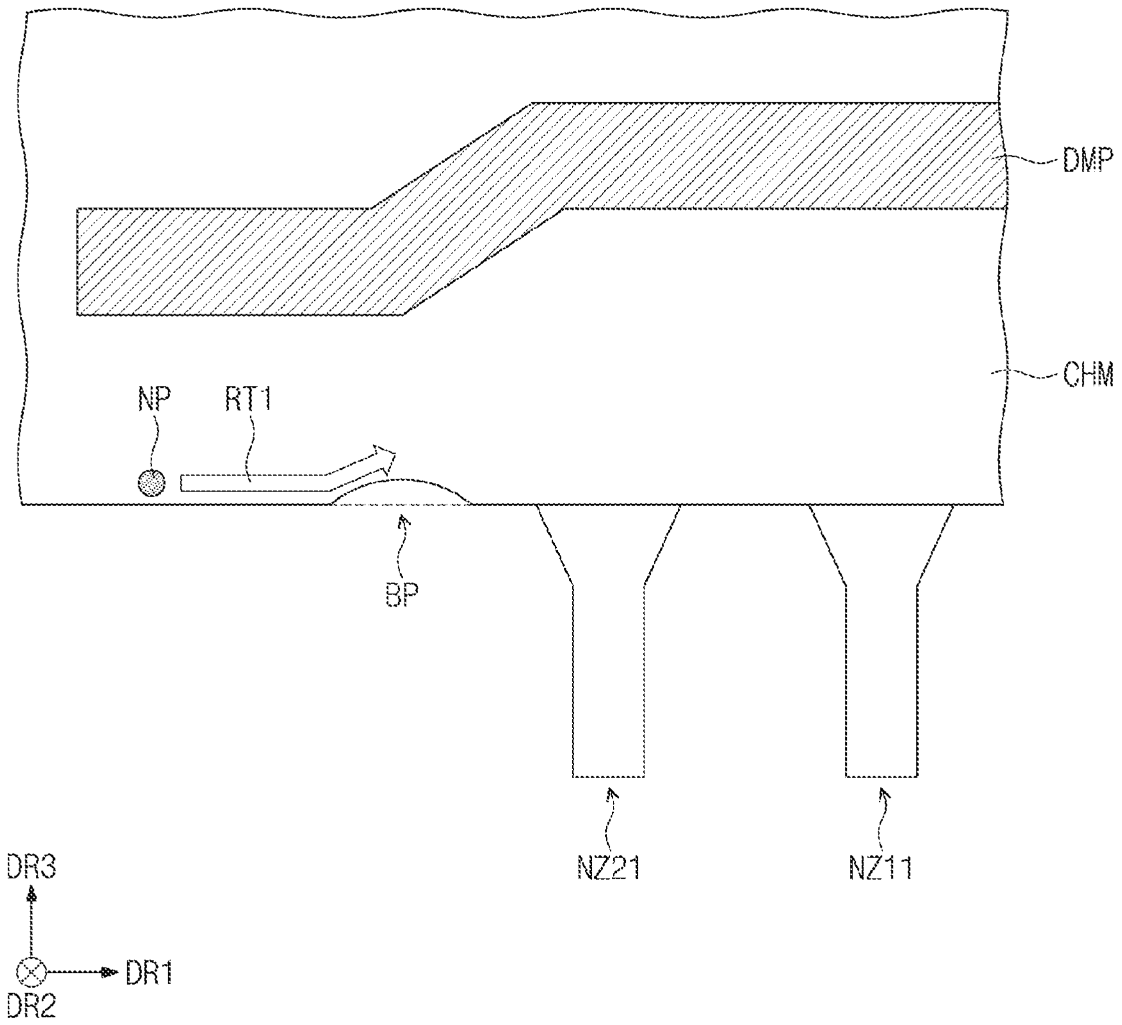
FIG. 8A is a cross-sectional view of an operation of an inkjet printing device according to an embodiment of the present disclosure.
Figure 8B:
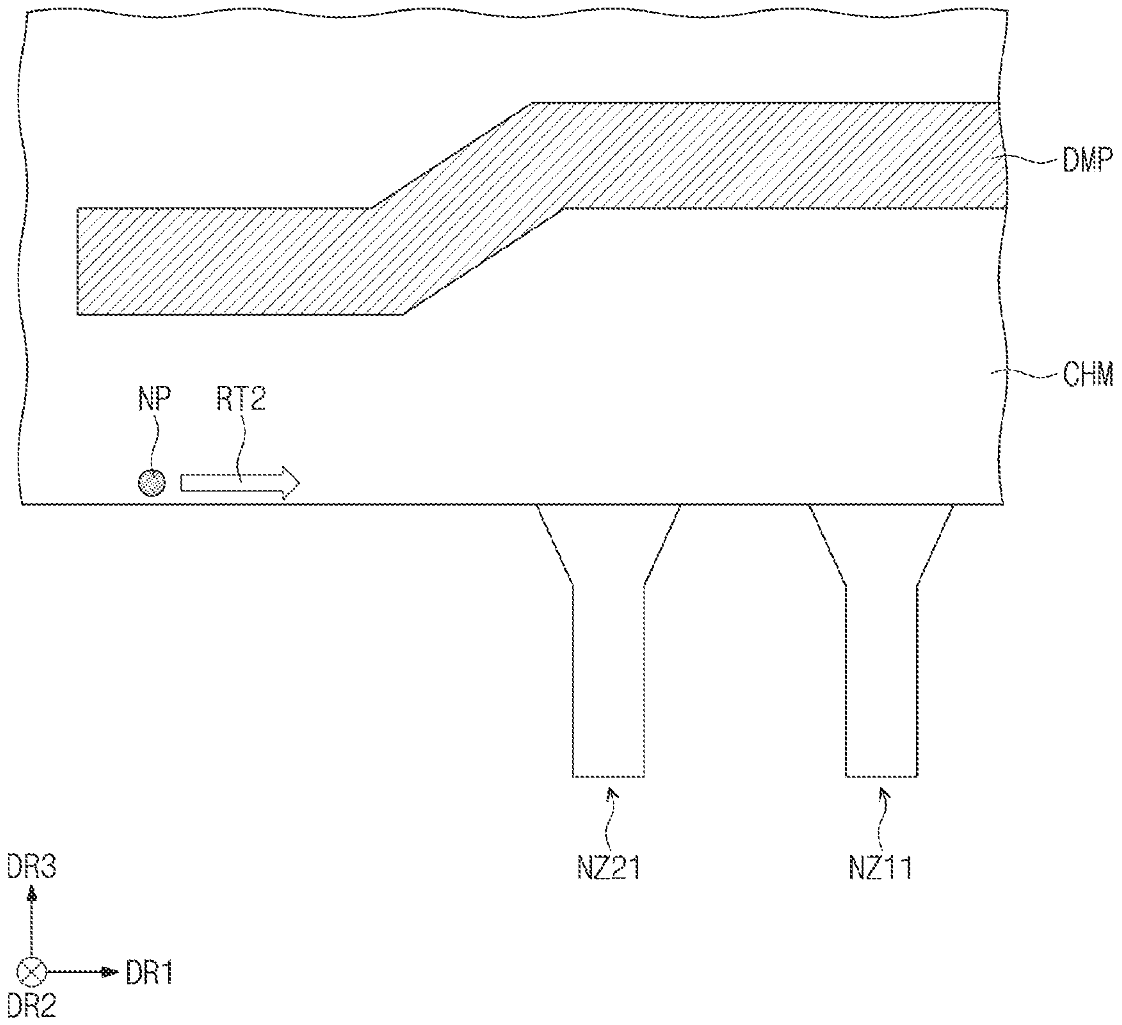
FIG. 8B is a cross-sectional view of an operation of an inkjet printing device according to a conventional device.

FIG. 8A is a cross-sectional view of an operation of the inkjet printing device according to an embodiment of the present disclosure. FIG. 8B is a cross-sectional view of an operation of an inkjet printing device according to a comparison embodiment. Different from the inkjet printing device according to an embodiment of the present disclosure, FIG. 8B shows an operation of the inkjet printing device that does not include the bump portion BP.

Referring to FIGS. 8A and 8B, in the process of discharging the ink to the inkjet nozzles NZ11 and NZ21 using the inkjet printing device, most of the nanoparticles NP among the nanoparticles NP included in the ink may enter the inkjet nozzles NZ11 and NZ21 while moving along the first direction DR1. According to the inkjet printing device, since the damper member DMP is disposed above the inkjet nozzles NZ11 and NZ21, an amount of the nanoparticles NP entering the inkjet nozzles NZ11 and NZ21 from a side portion after moving along the first direction DR1 may be greater than an amount of the nanoparticles NP entering the inkjet nozzles NZ11 and NZ21 from an upper portion.

According to the present disclosure, since the inkjet printing device includes the bump portion BP, a path of the nanoparticles NP moving along the first direction DR1 and entering the inkjet nozzles NZ11 and NZ21 from the side portion may be shifted upward as a first path RT1 shown in FIG. 8A.

In a case where the inkjet printing device does not include the bump portion BP as shown in FIG. 8B, since a path of nanoparticles NP, which move along the first direction DR1 and enter inkjet nozzles NZ21 and NZ11 from a side portion, is formed as a second path RT2, an amount of the nanoparticles NP entering an outer column nozzle NZ21 disposed at an outer side of the inkjet printing device is relatively large and an amount of the nanoparticles NP entering a center column nozzle NZ11 disposed closer to a center of inkjet printing device is relatively small. Accordingly, a concentration of the nanoparticles in the inks, which are respectively discharged via the nozzles NZ21 and NZ11, are different. This variation in nanoparticle concentration results in defects such as stains in the light control patterns formed by conventional inkjet printing device.

According to the inkjet printing device of the present disclosure, the path of the nanoparticles NP entering the inkjet nozzles NZ11 and NZ21 may be shifted due to the presence of bump portion BP. The bump portion BP causes the number of nanoparticles and the concentration of nanoparticles in the ink entering the outer column nozzle NZ21 arranged at the outer side among the inkjet nozzles NZ11 and NZ21 to be approximately the same as the number of nanoparticles and the concentration of nanoparticles in the ink entering the center column nozzle NZ11 arranged closer to the center. Accordingly, defects such as stains that occur in the conventional devices may be prevented from occurring in the light control patterns formed by the inkjet printing device of the present disclosure. A display efficiency of the display device including light control patterns may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. An inkjet device comprising:

a chamber storing ink; and a plurality of inkjet nozzles coupled to a bottom surface of the chamber and receiving the ink from the chamber, the inkjet nozzles being arranged in a plurality of columns along a first direction, wherein the inkjet nozzles comprise:

a center column nozzle disposed adjacent to an imaginary centerline of the chamber, the imaginary centerline dividing a length of the chamber in the first direction into two halves; and an outer column nozzle disposed farther from the centerline than the center column nozzle, wherein the chamber comprises a bump portion disposed farther from the centerline than the outer column nozzle, the bump portion comprising a bump, wherein the bump portion is recessed from the bottom surface of the chamber to an inside of the chamber, and each of the inkjet nozzles is protruded from the bottom surface of the chamber to an outside of the chamber, and wherein an extended height of the bump portion is less than a height of the chamber.

2. The inkjet printing device of claim 1, wherein the bump portion has a circular arc shape with a predetermined curvature in the cross-section.

3. The inkjet printing device of claim 1, wherein the center column nozzle comprises a first center column nozzle and a second center column nozzle disposed adjacent to the centerline from each other and spaced apart from each other in the first direction, the outer column nozzle comprises a first outer column nozzle disposed adjacent to the first center column nozzle and a second outer column nozzle disposed adjacent to the second center column nozzle, and the bump portion comprises a first bump portion disposed adjacent to the first outer column nozzle and a second bump portion disposed adjacent to the second outer column nozzle.

4. The inkjet printing device of claim 1 further comprising a damper member inside the chamber, wherein the damper member is disposed to overlap each of the inkjet nozzles when viewed in a plane.

5. The inkjet printing device of claim 1, wherein the ink is discharged to the inkjet nozzles by a pressure formed in the chamber.

6. The inkjet printing device of claim 1, wherein each of the center column nozzle and the outer column nozzle comprises a plurality of unit nozzles arranged in a second direction crossing the first direction.

7. The inkjet printing device of claim 6, wherein the bump portion extends in the second direction.

8. The inkjet printing device of claim 6, wherein the bump portion comprises a plurality of unit bump portions parallel to the plurality of unit nozzles in the first direction, respectively.

9. The inkjet printing device of claim 6, wherein the plurality of unit nozzles comprise an outer row unit nozzle disposed at an outermost position in the second direction, and the chamber further comprises an additional bump portion disposed adjacent to the outer row unit nozzle.

10. The inkjet printing device of claim 1, wherein the inkjet nozzles discharge ink that comprises nanoparticles.

11. The inkjet printing device of claim 10, wherein the nanoparticles comprise a quantum dot that converts a wavelength of an incident light to a light having a wavelength different from the wavelength of the incident light.

12. The inkjet printing device of claim 10, wherein the nanoparticles comprise a scatterer that scatters an incident light.

13. The inkjet printing device of claim 10, wherein the ink comprises a first ink supplied to the center column nozzle and a second ink supplied to the outer column nozzle, and a volume number density of the nanoparticles of the first ink is substantially equal to a volume number density of the nanoparticles of the second ink.

14. An inkjet printing device comprising:

a chamber storing ink; and a plurality of inkjet nozzles coupled to a bottom surface of the chamber and receiving the ink from the chamber, the inkjet nozzles being arranged in a plurality of columns along a first direction, wherein the inkjet nozzles comprise:

a center column nozzle disposed adjacent to an imaginary centerline of the chamber, the imaginary centerline dividing a length of the chamber in the first direction into two halves; and an outer column nozzle disposed farther from the centerline than the center column nozzle, wherein the chamber comprises a bump portion disposed farther from the centerline than the outer column nozzle, and the bump portion comprises a bump, the bump having a circular arc shape in a cross-section, wherein the bump portion is recessed from the bottom surface of the chamber to an inside of the chamber, and each of the inkjet nozzles is protruded from the bottom surface of the chamber to an outside of the chamber, and wherein an extended height of the bump portion is less than a height of the chamber.

15. The inkjet printing device of claim 14, wherein the ink that is discharged by the inkjet nozzles is ink that comprises nanoparticles, and wherein the ink comprises a first ink supplied to the center column nozzle and a second ink supplied to the outer column nozzle, and a volume number density of the nanoparticles of the first ink is substantially equal to a volume number density of the nanoparticles of the second ink.

* * * * *